(12) United States Patent
Parulski et al.

(10) Patent No.: US 10,136,260 B2
(45) Date of Patent: Nov. 20, 2018

(54) SELECTIVELY PROVIDING MOBILE EXPERIENCES AT MULTIPLE LOCATIONS

(71) Applicant: TOURBLEND INNOVATIONS, LLC, Rochester, NY (US)

(72) Inventors: Kenneth A Parulski, Rochester, NY (US); Brian J O'Keefe, West Sayville, NY (US); Leslie G Moore, Rochester, NY (US)

(*) Notice: Subject to any disclaimer, the term of this patent is extended or adjusted under 35 U.S.C. 154(b) by 46 days.

(21) Appl. No.: 15/151,448

(22) Filed: May 10, 2016

(65) Prior Publication Data

US 2016/0255477 A1    Sep. 1, 2016

Related U.S. Application Data

(63) Continuation of application No. 14/219,901, filed on Mar. 19, 2014, now abandoned.

(60) Provisional application No. 61/804,608, filed on Mar. 22, 2013.

(51) Int. Cl.
| | |
|---|---|
| H04W 4/02 | (2018.01) |
| H04L 29/08 | (2006.01) |
| G06F 17/30 | (2006.01) |
| G06Q 30/02 | (2012.01) |

(52) U.S. Cl.
CPC ............ *H04W 4/027* (2013.01); *H04L 67/18* (2013.01); *H04L 67/306* (2013.01); *H04W 4/02* (2013.01); *G06F 17/3087* (2013.01); *G06Q 30/02* (2013.01)

(58) Field of Classification Search
CPC ..... H04W 4/022; H04W 4/02; G06F 17/3087; G06F 17/30056; G06F 17/30265; H04N 1/00183; G06Q 30/02

USPC .................................. 455/456.3, 456.1, 457
See application file for complete search history.

(56) References Cited

U.S. PATENT DOCUMENTS

| | | | |
|---|---|---|---|
| 5,850,610 | A | 12/1998 | Testani et al. |
| 6,157,841 | A | 12/2000 | Bolduc et al. |
| 7,146,179 | B2 | 12/2006 | Parulski et al. |
| 7,463,977 | B2 | 12/2008 | Price et al. |
| 8,358,358 | B2 | 1/2013 | Gallagher et al. |
| 8,405,740 | B2 | 3/2013 | Nichols et al. |
| 2002/0011951 | A1 | 1/2002 | Pepin et al. |
| 2002/0183072 | A1 | 12/2002 | Steinbach et al. |
| 2005/0192025 | A1 | 9/2005 | Kaplan |
| 2008/0129528 | A1 | 6/2008 | Guthrie |
| 2008/0174676 | A1 | 7/2008 | Squilla et al. |

(Continued)

OTHER PUBLICATIONS

Mokbel, et al,Toward context and preference-aware location-based services, published in MobiDE'09, Jun. 29, 2009, Providence, RI, USA.

*Primary Examiner* — Charles Appiah
*Assistant Examiner* — Margaret G Mastrodonato

(57) ABSTRACT

Disclosed herein are, among other things, systems and methods for providing location-based digital stories to a user of processing a device system, such as a mobile device. In some embodiments, a user profile associated with the user and data indicating a plurality of location-specific digital stories related to a common theme at a plurality of locations may be stored. A processing device system may be configured to determine a current location of the mobile device and to provide a first or second digital story to the mobile device based on an analysis of the stored user profile and the current location.

20 Claims, 15 Drawing Sheets

(56) References Cited

U.S. PATENT DOCUMENTS

| | | | |
|---|---|---|---|
| 2009/0005080 A1* | 1/2009 | Forstall | H04W 4/02 455/456.3 |
| 2010/0063726 A1 | 3/2010 | Marjenberg et al. | |
| 2010/0113065 A1* | 5/2010 | Narayan | H04W 4/02 455/456.3 |
| 2012/0113144 A1 | 5/2012 | Adhikari et al. | |
| 2012/0115512 A1* | 5/2012 | Grainger | G01S 5/0257 455/456.3 |
| 2013/0173531 A1* | 7/2013 | Rinearson | G06F 17/30011 707/608 |
| 2013/0191211 A1 | 7/2013 | Nichols et al. | |
| 2013/0307997 A1 | 11/2013 | O'Keefe et al. | |

* cited by examiner

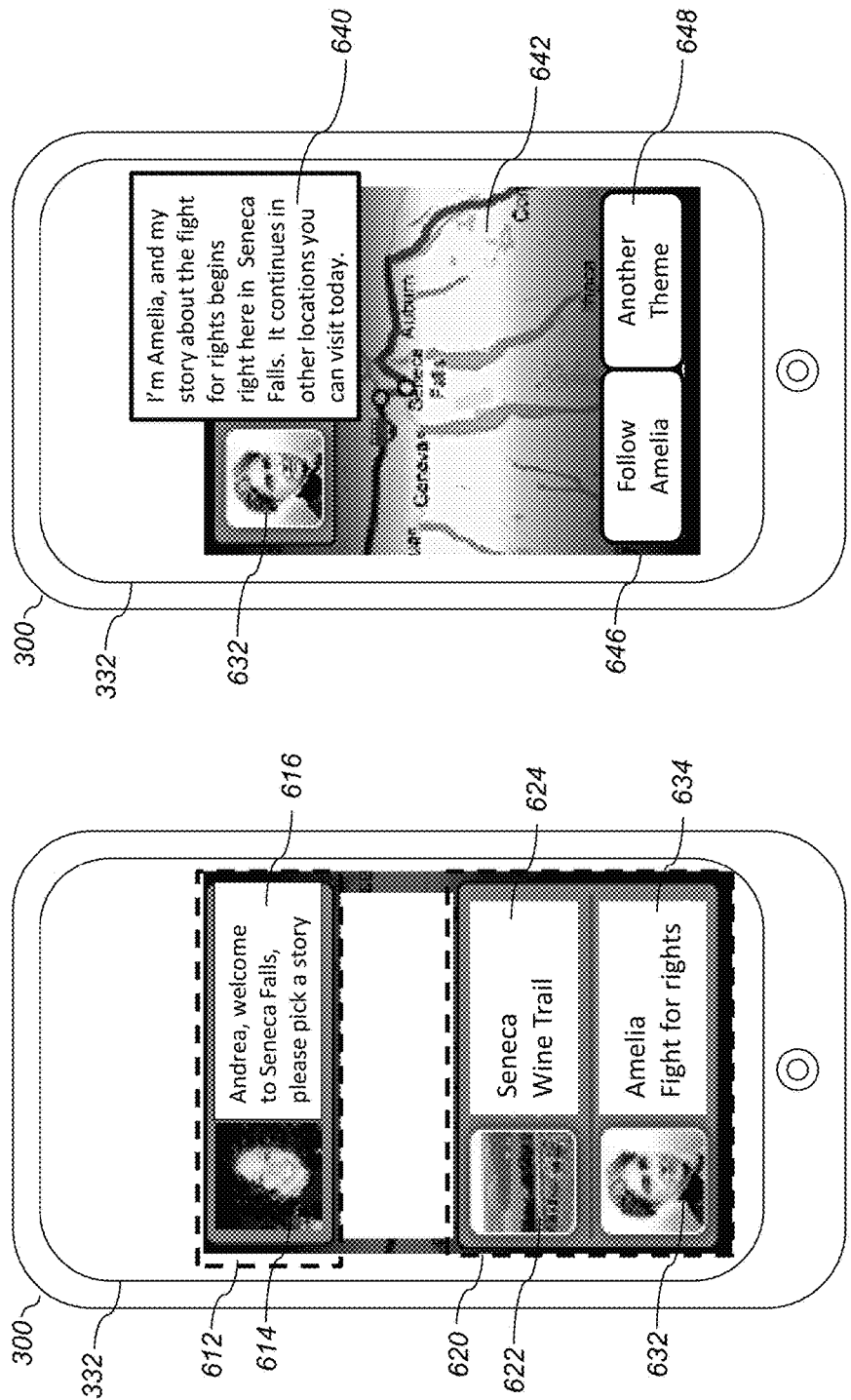

SELECTIVELY PROVIDING MOBILE EXPERIENCES AT MULTIPLE LOCATIONS

CROSS-REFERENCE TO RELATED APPLICATIONS

This is a continuation of prior U.S. patent application Ser. No. 14/219,901, filed Mar. 19, 2014, which claims priority to U.S. Provisional Application No. 61/804,608, filed Mar. 22, 2013, each of which is incorporated herein by reference in its entirety.

TECHNICAL FIELD

Some embodiments of the present invention relate to personalized travel experiences. For example, some embodiments of the present invention relate to mobile devices and systems, as well as related methods, for providing digital story experiences related to a common theme at different geographic locations.

BACKGROUND

Smart phones, tablet computers, and other portable devices incorporating wireless connections to the Internet have opened up opportunities for new, entertaining tourism experiences. These devices are currently used to provide location-aware travel guides to various cities and historical sites. For example, various smart phone apps provide a guide to restaurants, bars, and nightlife in cities such as Boston and New York. Some of these apps use the smart phone's built-in GPS to provide various maps and lists of venues in order of distance from the user's current location.

As another example, Fodor's™ City Apps provides iPhone™ and Android™ apps for a number of major cities, including New York City. The Fodor's apps provide recommendations for sightseeing, restaurants and hotels. Each Fodor's app permits the user to book hotels, restaurants, and entertainment in the particular city, using Expedia™, OpenTable™, and TicketsNow™. It also permits the user to bookmark and create comments about their favorite attractions. The user can download an interactive offline map and reviews, so that the user can browse the map, read reviews, and make notes when in the subway or other areas with poor wireless reception.

It is known to provide preference-aware location-based services, as described in the paper titled "Toward context and preference-aware location-based services" authored by Mokbel, et al published in MobiDE'09, Jun. 29, 2009, Providence, R.I., USA. Such systems tailor their services based on the preference and context of each customer. For example, in a restaurant finder application, the system can use the dietary restrictions, price range, other user ratings, current traffic, and current waiting time to recommend nearby restaurants to the customer, rather than recommending all of the closest restaurants.

Photography is often used to record and share experiences, such as vacation trips, family outings, or seasonal events. Still and video images of such experiences can be captured using image capture devices including camera phones (such as smart phones), digital still cameras, and camcorders. The digital images captured by these image capture devices can be shared by e-mail and uploaded to web sites such as Facebook™ and Flickr™, where they can be viewed by friends. The uploaded images can be printed using on-line photo service providers, such as Shutterfly™. Users can order photo products, such as photo books and collages, which utilize uploaded digital images.

It is known to produce enhanced photo products by combining images captured with connected image capture devices, such as smart phones, and professionally produced digital content related to the area where the photographs were captured, as described in U.S. Pat. No. 8,405,740 titled "Guidance for image capture at different locations", issued to Nichols, et al.

It is known to use a "geofence" to create a virtual perimeter for a real-world geographic area, such as a boundary around a store, school, or other area of interest. When the location-aware device (such as a smart phone) of a location-based service (LBS) user enters or exits a geofence, the device can generate a notification. The notification can be sent to an email account or another smart phone. For example, a parent can be notified when a child leaves an area defined by a geofence.

It is known to utilize augmented reality in apps running on smart phones. For example, the Aurasma™ augmented reality platform developed by Hewlett Packard ("HP")™, Palo Alto, Calif. can enable a smart phone to recognize real world images. The real world images can be overlaid with animations, videos, and 3D models to provide augmented reality experiences.

Another known prior art system is "Locast", developed by the MIT media Lab. According to their website, Locast can be used to create interactive narratives that are crafted by linking together videos and photos thematically, geographically, and chronologically. These stories can be explored by viewers in a non-linear fashion. This MIT group has developed the Open Locast Web Application, which includes a map-based front-end built upon OpenLayers and the Google™ Maps API, that provides an interface for browsing, searching, and interacting with media content. This group has also developed the Open Locast Android Application, which provides interactive content recording/creation, browsing and searching. It supports content synchronization for offline content capturing, viewing and browsing, allowing for use in locations with limited or no connectivity.

However, there is a need in the art for improvements in the above-discussed technologies.

SUMMARY

At least the above-discussed need is addressed and technical solutions are achieved by various embodiments of the present invention. In some embodiments a method executed by a data processing device system includes the steps of storing, in a processor-accessible memory device system communicatively connected to the data processing device system, a user profile associated with a user; storing, in the processor-accessible memory device system, data indicating a plurality of location-specific digital stories related to a common theme at a plurality of locations; determining whether or not a current location of a mobile device associated with the user corresponds to one of the plurality of locations related to the plurality of location-specific digital stories; determining, if it is determined that the current location of the mobile device corresponds to a first one of the plurality of locations, and based at least on an analysis of the user profile, that either a first case or a second case exists indicating that the user has or has not, respectively, been presented with at least one of the plurality of location-specific digital stories at a different one of the plurality of locations different than the first one; providing a first digital story to the mobile device in response to it being determined that the first case exists; and providing a second digital story to the mobile device in response to it being determined that the second case exists.

The first digital story may introduce the common theme, and the second digital story may continue the common theme, which was introduced at the different one of the plurality of locations.

User profiles for a plurality of users, and the data, may be stored by a network-accessible storage system.

In some embodiments, the method may include the step of providing general content to the mobile device if it is determined that the current location of the mobile device does not correspond to one of the plurality of locations related to the plurality of location-specific digital stories.

In some embodiments, at least some of the plurality of location-specific digital stories are associated with particular travel directions, and the method may include determining a travel direction of the mobile device and providing the first digital story or the second digital story in response to the determined travel direction. The user profile may include at least one user preference, and the method may include selecting the first digital story from a plurality of stored first digital stories in response to the stored user preference. The plurality of stored first digital stories may be related to the first one of the plurality of locations. The user preference may include a language preference, and the method may include accessing the stored user profile to determine the language preference and selecting the first digital story from the plurality of stored first digital stories in response to the determining of the language preference. In some embodiments, the user preference includes a demographic group of the user, and the method includes accessing the stored user profile to determine the language preference and selecting the first digital story from the plurality of stored first digital stories in response to the determining of the demographic group.

In some embodiments the first digital story, the second digital story, or both is or are configured to instruct the user to capture one or more digital images, and the method includes requesting a photo product related to the common theme. The photo product may be defined to incorporate at least one digital image captured by the user.

In some embodiments, the method includes suggesting a location for a next digital story in response to answers provided by the user during the first digital story or the second digital story.

According to some embodiments, a mobile device may include a memory device system story content data; an output device system; a location determination unit configured to determine a geographic location of the mobile device; and a data processing device system communicatively connected to the output device system, the memory device system, and the location determination unit. The memory device system may store program instructions configured to cause the data processing system at least to: store, in the memory device system, data indicating a plurality of location-specific digital stories related to a common theme at a plurality of locations; determine whether or not a current location of the mobile device, which is provided by the location determination unit, corresponds to one of the plurality of locations related to the plurality of location-specific digital stories; determine, if it is determined that the current location of the mobile device corresponds to a first one of the plurality of locations, that either a first case or a second case exists indicating that the user has or has not, respectively, been presented with at least one of the plurality of location-specific digital stories at a different one of the plurality of locations different than the first one; acquire, from the memory device system, first digital story content data of the digital story content data and provide the first digital story content data to the output device system in response to it being determined that the first case exists; and acquire, from the memory device system, second digital story content data of the digital story content data and provide the second digital story content data to the output device system in response to it being determined that the second case exists.

The output device system may include an image display, a speaker, an audio output jack, or a combination thereof. The first digital story content data, the second digital story content data, or both may include audio content data, and the program instructions may be configured to cause the data processing device system at least to provide music content data to the output device system when the current location of the mobile device does not correspond to one of the plurality of locations. The first digital story content data, the second digital story content data, or both may be configured to instruct the user to capture one or more digital images using the mobile device.

In some embodiments, at least some of the plurality of location-specific digital stories are associated with particular travel directions, and the program instructions are configured to cause the data processing device system at least to: determine, based at least on input from the location determination unit, a travel direction of the mobile device; and provide the first digital story content data or the second digital content data in response to the determined travel direction.

In some embodiments, a system includes a memory device system storing a user profile associated with a user of a mobile device; a network-accessible storage device system storing data indicating a plurality of location-specific digital stories related to a common theme at a plurality of locations; a location determination unit configured to determine a geographic location of the mobile device; and a data processing device system. The data processing device system may be configured at least to: determine whether or not a current location of the mobile device, which is provided by the location determination unit, corresponds to one of the plurality of locations related to the plurality of location-specific digital stories; determine, if it is determined that the current location of the mobile device corresponds to a first one of the plurality of locations, and based at least on an analysis of the user profile, that either a first case or a second case exists indicating that the user has or has not, respectively, been presented with at least one of the plurality of location-specific digital stories by the mobile device at a different one of the plurality of locations different than the first one; provide a first digital story of the plurality of location-specific digital stories stored by the network-accessible storage device system to the mobile device in response to it being determined that the first case exists; and provide a second digital story of the plurality of location-specific digital stories stored by the network-accessible storage device system to the mobile device in response to it being determined that the second case exists.

In some embodiments, the data processing device system is configured to automatically determine whether or not to provide the first digital story using audio data, based on measurements performed by the mobile device.

The memory device system, which stores the user profile, may also store user profiles for a plurality of users and may be at least part of the network-accessible storage device system.

The first digital story, the second digital story, or both, (a) may include an augmented reality image of a historical character, and (b) may be configured to cause the mobile device to display the augmented reality image of the historical character along with an image captured by the mobile device.

In some embodiments, at least some of the plurality of location-specific digital stories are associated with particular travel directions, and the data processing device system is configured at least to: determine a travel direction of the mobile device; and provide the first digital story or the second digital story in response to the determined travel direction.

Any of the features of any of the methods discussed herein may be combined with any of the other features of any of the methods discussed in herein. In addition, a computer program product may be provided that comprises program code portions for performing some or all of any of the methods and associated features thereof described herein, when the computer program product is executed by a computer or other computing device or device system. Such a computer program product may be stored on one or more non-transitory computer-readable storage mediums.

In some embodiments, each of any or all of the computer-readable data storage medium systems described herein is a non-transitory computer-readable data storage medium system including one or more non-transitory computer-readable storage mediums storing one or more programs or program products which configure a data processing device system to execute some or all of one or more of the methods described herein.

Further, any or all of the methods and associated features thereof discussed herein may be implemented as all or part of a device system or apparatus.

Various systems may include combinations or subsets of all the systems and associated features thereof described herein.

BRIEF DESCRIPTION OF THE DRAWINGS

It is to be understood that the attached drawings are for purposes of illustrating aspects of various embodiments and may include elements that are not to scale.

FIG. 7A depicts an example of a user interface screen for selecting a theme for location-specific stories, according to some embodiments of the present invention;

FIG. 7B depicts a user interface screen which begins to introduce a theme and character of a story, according to some embodiments of the present invention;

DETAILED DESCRIPTION

Figure 1:
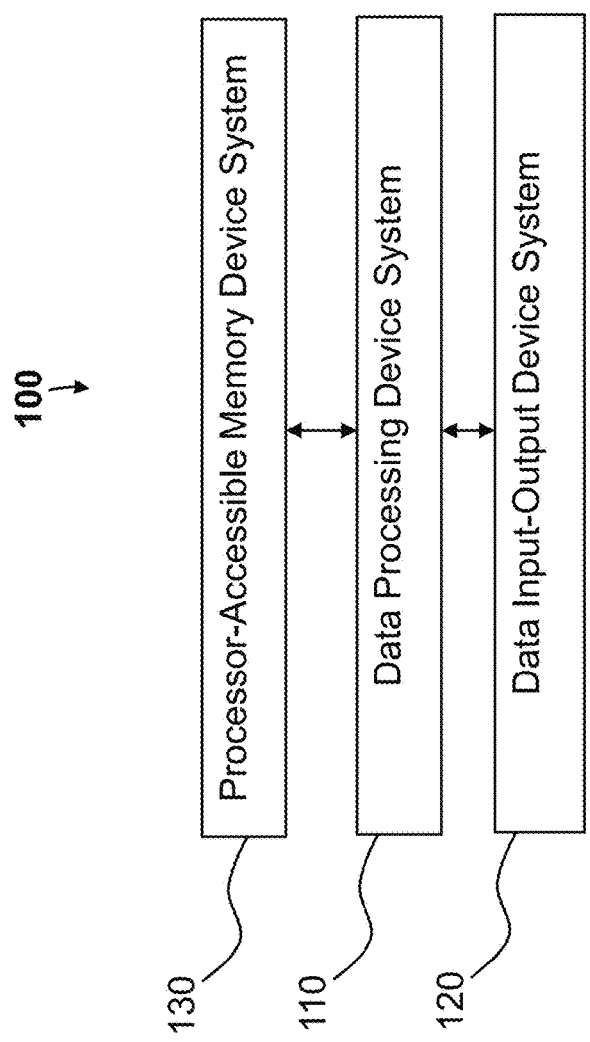
FIG. 1 illustrates a system configured to generate personalized travel experiences, according to some embodiments of the present invention.

In the following description, some embodiments of the present invention are described in terms that may be implemented at least in part as one or more software programs configured to be executed by a data processing device system. Some or all of such software programs may be equivalently constructed in hardware. Software and hardware not specifically shown, suggested, or described herein that is useful for implementation of any of various embodiments of the present invention are conventional and within the ordinary skill of the art.

In this regard, in the descriptions herein, certain specific details are set forth in order to provide a thorough understanding of various embodiments of the invention. However, one skilled in the art will understand that the invention may be practiced at a more general level without these details. In other instances, well-known structures have not been shown or described in detail to avoid unnecessarily obscuring descriptions of various embodiments of the invention.

Reference throughout this specification to "one embodiment" or "an embodiment" or "an example embodiment" or "an illustrated embodiment" or "a particular embodiment" and the like means that a particular feature, structure or characteristic described in connection with the embodiment is included in at least one embodiment. Thus, the appearances of the phrases "in one embodiment" or "in an embodiment" or "in an example embodiment" or "in this illustrated embodiment" or "in this particular embodiment" and the like in various places throughout this specification are not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more, and the word "subset" is intended to mean a set having the same or fewer elements of those present in the subset's parent or superset.

Further, the phrase "at least" is used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least upon A' includes A as well as the possibility of one or more other additional elements besides A. In the same manner, the phrase, 'based upon A' includes A, as well as the possibility of one or more other additional elements besides A. However, the phrase, 'based only upon A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The term "program" in this disclosure should be interpreted as a set of instructions or modules that may be executed by one or more components in a system, such as a controller system or data processing device system, in order to cause the system to perform one or more operations. The set of instructions or modules may be stored by any kind of memory device, such as those described subsequently with respect to FIG. 1, FIG. 2, and FIG. 3. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). The word "module" may be defined as a set of instructions.

The word "device" and the phrase "device system" both are intended to include one or more physical devices or sub-devices (e.g., pieces of equipment) that interact to perform one or more functions, regardless of whether such devices or sub-devices are located within a same housing or different housings. In this regard, the word "device", may equivalently be referred to as a "device system".

Further, the phrase "in response to" may be used in this disclosure. For example, this phrase might be used in the following context, where an event A occurs in response to the occurrence of an event B. In this regard, such phrase includes, for example, that at least the occurrence of the event B causes or triggers the event A.

FIG. 1 schematically illustrates a personalized travel experience generation system 100, according to some embodiments of the present invention. The system 100 may include a data processing device system 110, a data input-output device system 120, and a processor-accessible memory device system 130. The processor-accessible memory device system 130 and the data input-output device system 120 are communicatively connected to the data processing device system 110.

Figure 4:
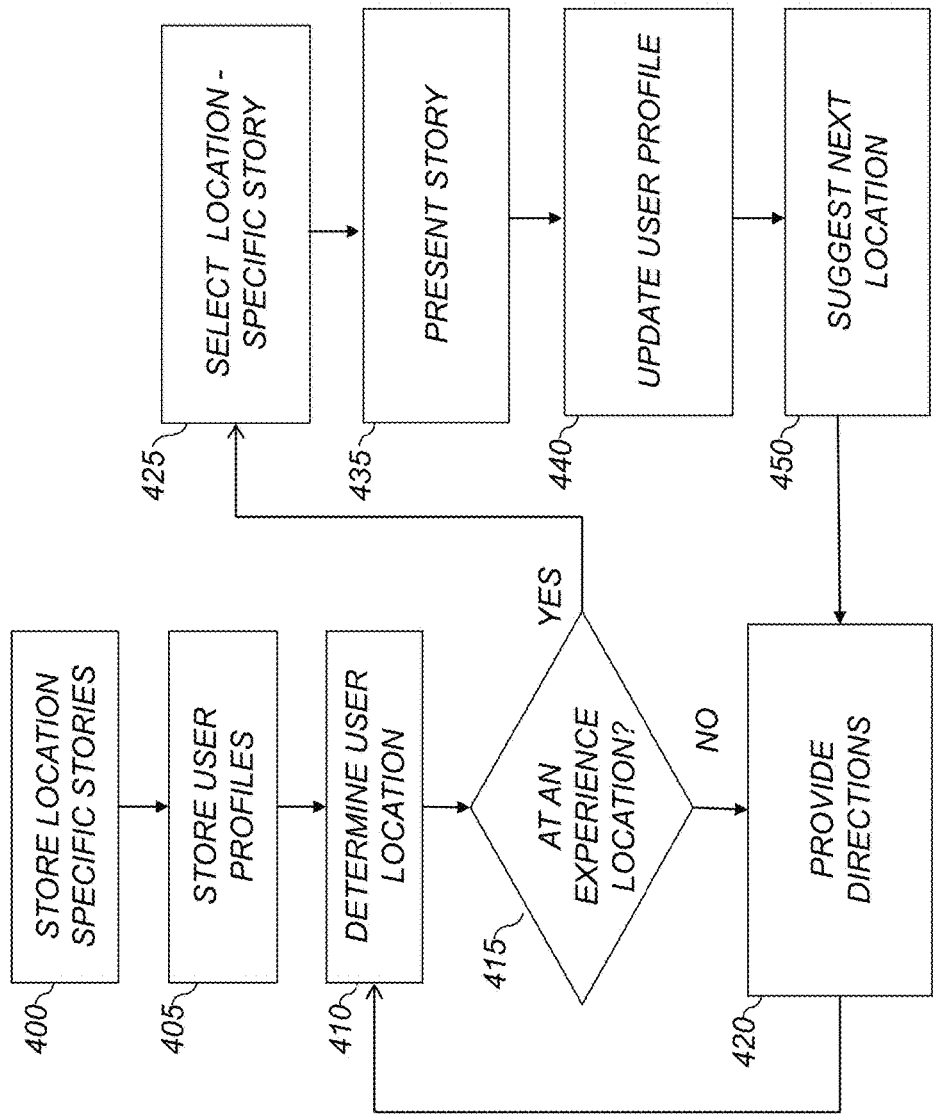
FIG. 4 is a flow diagram depicting steps for providing location-specific digital stories related to a common theme at a plurality of different locations, according to some embodiments of the present invention.
Figure 5:
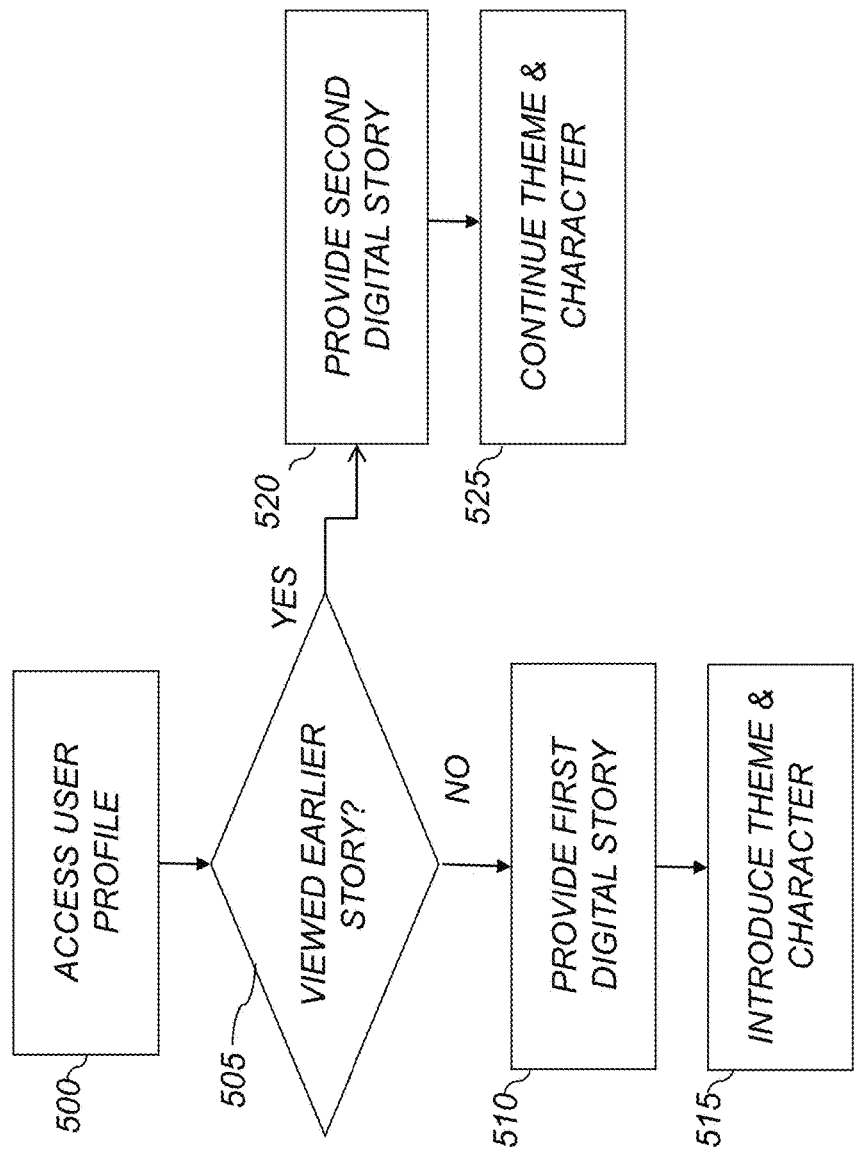
FIG. 5 is a flow diagram depicting a particular implementation of step 425 in FIG. 4 pertaining to selecting a location specific story, according to some embodiments of the present invention.
Figure 12:
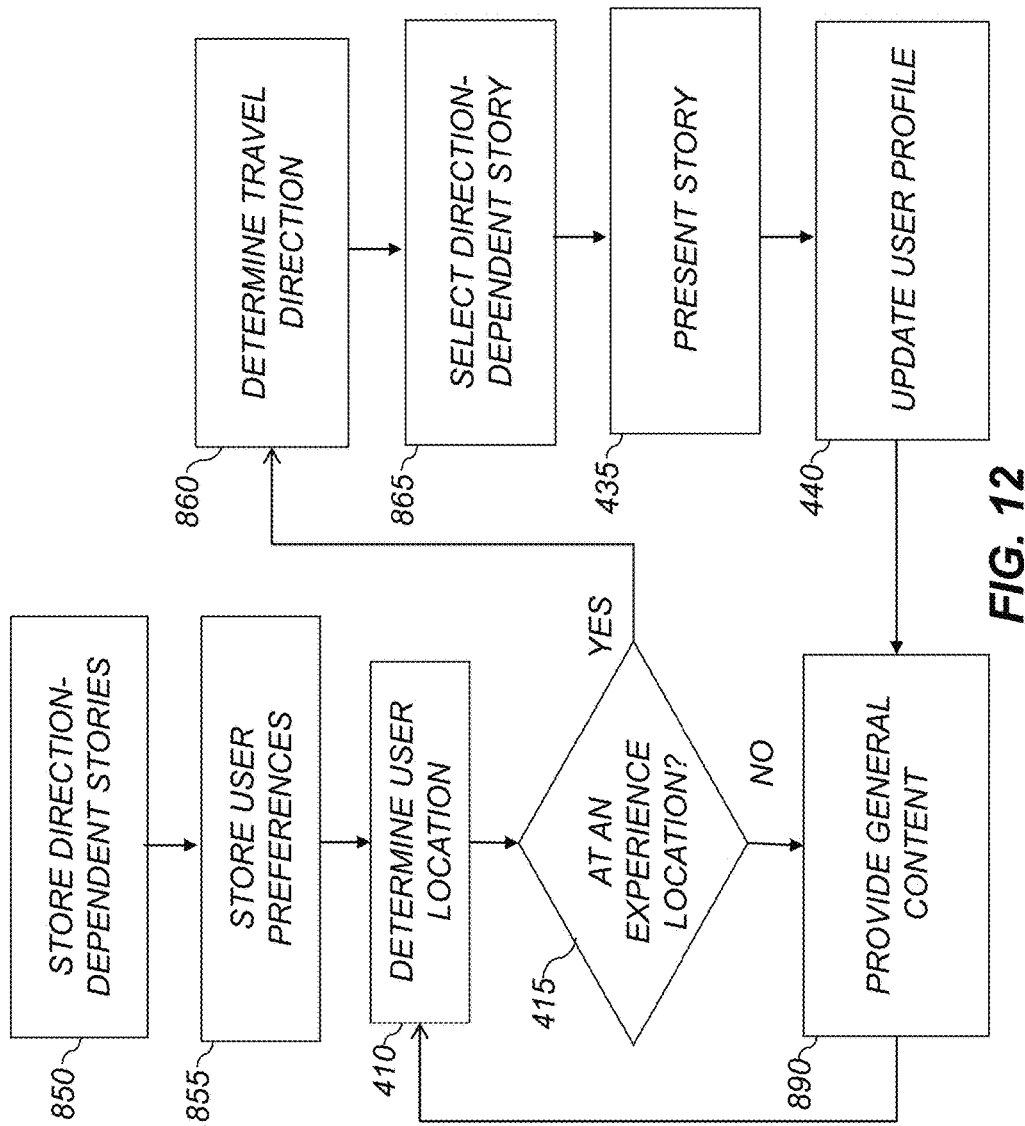
FIG. 12 is a flow diagram depicting steps for providing travel direction-dependent digital stories at a plurality of different locations, according to some embodiments of the present invention.

The data processing device system 110 includes one or more data processing devices that implement or execute, in conjunction with other devices, such as those in the system 100, methods of various embodiments of the present invention, including the example methods of FIG. 4, FIG. 5, and FIG. 12 described herein. Each of the phrases "data processing device", "data processor", "processor", and "computer" and the like is intended to include any data processing device, such as a central processing unit ("CPU"), a desktop computer, a laptop computer, a mainframe computer, a tablet computer such as an iPad™, a personal digital assistant, a cellular phone, a mobile device, a smart phone, or any other device for processing data, managing data, or handling data, whether implemented with electrical, magnetic, optical, biological components, or otherwise. In this regard, while some embodiments of the present invention are described herein in the context of one or more mobile devices, such as a smart phone, the invention is not so limited, and any other data processing device system may be used instead of or in addition to a mobile device.

The processor-accessible memory device system 130 includes one or more processor-accessible memory devices configured to store program instructions and other information, including the information and program instructions needed by a data processing device system to execute the methods of various embodiments, including the example methods of FIG. 4, FIG. 5, and FIG. 12 described herein. In this regard, each of the steps illustrated in the example methods of FIG. 4, FIG. 5, and FIG. 12 may represent program instructions stored in the processor-accessible memory device system 130 and configured to cause a data processing device system to execute the respective step. The processor-accessible memory device system 130 may be a distributed processor-accessible memory device system including multiple processor-accessible memory devices communicatively connected to the data processing device system 110 via a plurality of computers and/or devices. On the other hand, the processor-accessible memory device system 130 need not be a distributed processor-accessible memory system and, consequently, may include one or more processor-accessible memory devices located within a single data processing device.

Each of the phrases "processor-accessible memory", "processor-accessible memory device", and the like is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, EEPROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable)

data storage medium. In some embodiments, the memory device system 130 may be considered to include or be a non-transitory processor-accessible (or computer-readable) data storage medium system. And, in some embodiments, the memory device system 130 may be considered to include or be a non-transitory processor-accessible (or computer-readable) storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory device system 130 is shown separately from the data processing device system 110 and the data input-output device system 120, one skilled in the art will appreciate that the processor-accessible memory device system 130 may be located completely or partially within the data processing device system 110 or the data input-output device system 120. Further in this regard, although the data input-output device system 120 is shown separately from the data processing device system 110 and the processor-accessible memory device system 130, one skilled in the art will appreciate that such system may be located completely or partially within the data processing system 110 or the processor-accessible memory device system 130, depending upon the contents of the input-output device system 120. Further still, the data processing device system 110, the data input-output device system 120, and the processor-accessible memory device system 130 may be located entirely within the same device or housing or may be separately located, but communicatively connected, among different devices or housings. In the case where the data processing device system 110, the data input-output device system 120, and the processor-accessible memory device system 130 are located within the same device, the system 100 of FIG. 1 may be implemented by a single application-specific integrated circuit (ASIC) in some embodiments.

The data input-output device system 120 may include a mouse, a keyboard, a touch screen, a computer, a processor-accessible memory device, a network-interface-card or network-interface circuitry, or any device or combination of devices from which a desired selection, desired information, instructions, or any other data is input to the data processing device system 110. The data input-output device system 120 may include a user-activatable control system that is responsive to a user action. The data input-output device system 120 may include any suitable interface for receiving a selection, information, instructions, or any other data from other devices or systems described in various ones of the embodiments.

The data input-output device system 120 also may include an image generating device system, a display device system, an audio generating device system, an audio transducer, a computer, a processor-accessible memory device, a network-interface-card or network-interface circuitry, or any device or combination of devices to which information, instructions, or any other data is output by the data processing device system 110. The input-output device system 120 may include any suitable interface for outputting information, instructions, or data to other devices and systems described in various ones of the embodiments. If the input-output device system 120 includes a processor-accessible memory device, such memory device may or may not form part or all of the memory device system 130.

The user interfaces of at least FIG. 7A, 7B, 8A, 8B, 9, 10, or a combination thereof may be implemented as part of the data input-output device system 120, according to various ones of some embodiments of the present invention.

Figure 2:
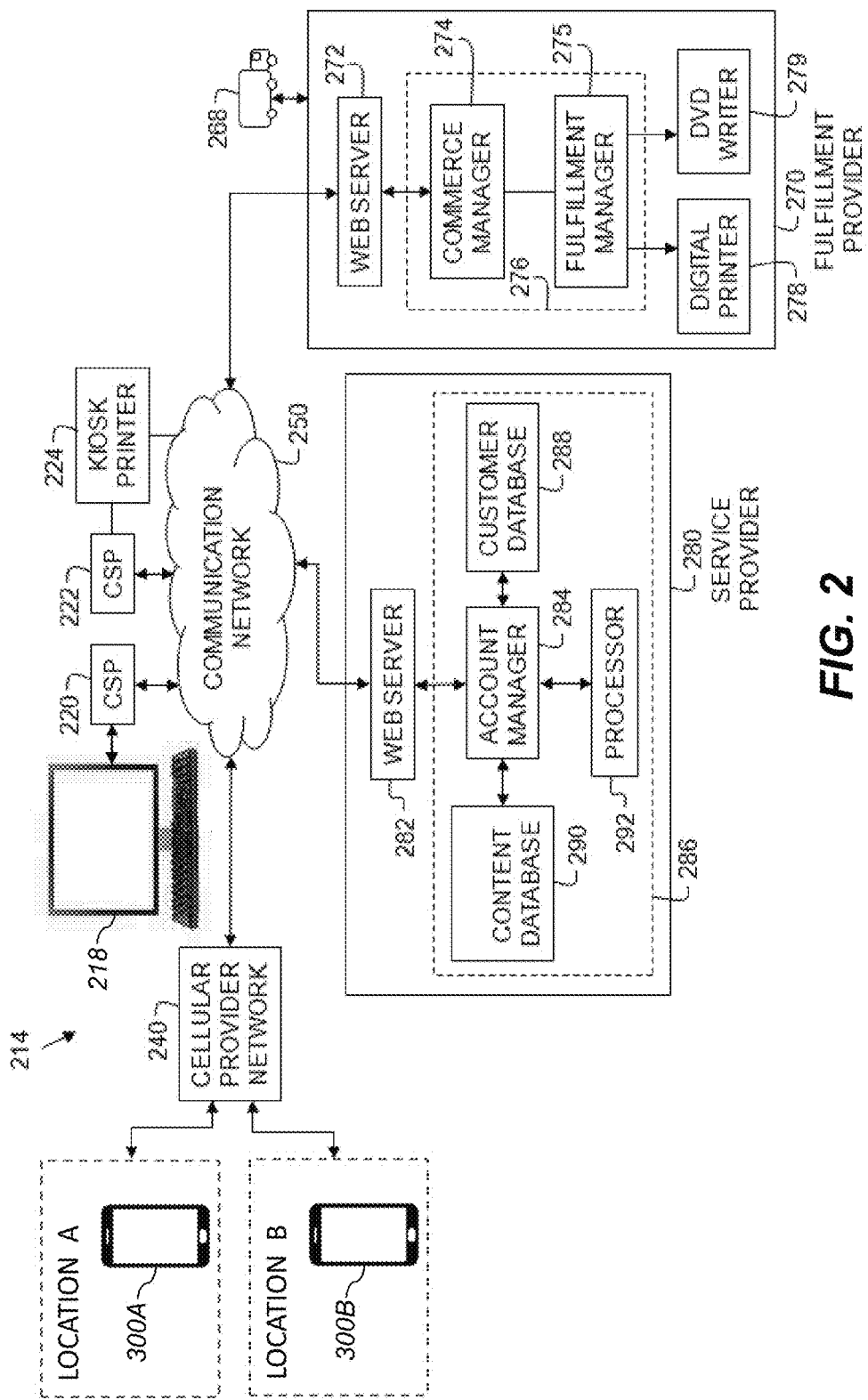
FIG. 2 is a block diagram of a particular implementation of the system of FIG. 1 in accordance with some embodiments of the present invention.

FIG. 2 is a block diagram of a particular implementation of the system of FIG. 1 in accordance with some embodiments of the present invention. In FIG. 2, there is illustrated a system 214 for providing location-based digital stories to a plurality of users of mobile devices at a plurality of locations. As used herein the phrase digital story relates to, among other things, a telling of a story with any of a variety of digital multimedia types, including digital audio, digital graphics images, including digital still photographs, and digital video images and animations. It will be understood that a digital story may relate to, for example, travel information, historic information or business information. As used herein, the phrase digital story experience relates to, among other things, the presentation of a digital story on a device, such as a smart phone or tablet computer, using digital audio, or digital still images including graphics, or digital video images, or a combination of digital audio, digital still images, and digital video images.

In FIG. 2, a first mobile device, such as smart phone 300A located at a first location A, and a second mobile device, such as smart phone 300B, located at a second location B, is communicatively connected with a service provider 280 using a cellular provider network 240. The cellular provider network 240 provides both voice and data communications using transmission devices located at cell towers throughout a region. The cellular provider network 240 is communicatively connected to a communication network 250, such as the Internet.

It will be understood that each mobile device, such as smart phone 300A, is typically owned or leased by a particular user. The smart phone 300A can be used to present a digital story to a single user or to a group of users who are viewing a display of the smart phone 300A, or listening to audio provided by the smart phone 300A. The user or group of users may be situated in a vehicle such as a car, for example, and the digital story can be provided by the vehicle's audio system using, for example, a Bluetooth™ connection to transmit the audio from the smart phone 300A to the vehicle's audio system as is well-known in the art.

It will be understood that system 214 typically includes many other mobile devices, in addition to smart phone 300A and smart phone 300B. It will be understood that the system 214 can include multiple cellular provider networks 240, for example networks provided by companies such as Verizon, AT&T, and Sprint, which can be communicatively connected to the communication network 250.

System 214 also includes one or more computers 218 which communicate with the communication network 250 and service provider 280 via a communication service provider (CSP) 220. In some embodiments, computer 218 enables remote users, who might not be able to travel to the locations where the location-specific stories are provided, to obtain a virtual experience from their home. For example, the user of one of the computers 218 can use a computer mouse to change their virtual location on a digital map displayed in a window on the display of the computer 218. The computer 218 can then be used, rather than one of the smart phones 300A, 330B, to provide a virtual digital story experience to a remote user, who may be located in another country, for example.

The communications network 250 enables communication with a service provider 280. Service provider 280 includes a web server 282 for interfacing with communications network 250. In addition to interfacing with communications network 250, web server 282 transfers data to a computer system 286 which manages data associated with various customers and digital story content associated with one or more themes at a plurality of locations.

It will be understood that the system 214 can include a plurality of service providers 280, which provide different services and can support different regions of the world.

The computer system 286 includes an account manager 284, which runs software to permit the creation and management of individual customer (e.g. user) accounts, including user profiles, which are stored in customer database 288. Thus, customer database 288 provides a network-accessible storage device system which stores profiles for a plurality of users of mobile devices, such as smart phones 300A and 300B. In some embodiments, the user profile information stored in customer database 288 can include personal information such as the user's nickname, full name and address, demographic information, and interests. In some embodiments, the demographic information in the user profile can include the approximate age of the user, whether the user is male or female, or a language preference of the user, since the user may be visiting from another country. In some embodiments, the user profile information stored in customer database 288 can also include billing information such as credit card information, and authorization information that controls access to the information in the customer database by third parties. In some embodiments, the user profile information stored in customer database 288 includes data which indicates which digital stories have been experienced by the user, including the theme, location, and the date and time that the digital story was presented to the user, as will be described later in reference to FIG. 4.

The account manager 284 also permits the uploading and management of collections of digital story content data for providing digital story experiences, such as digital audio recordings, digital still images, and digital video images associated with various story themes and locations, which is stored in content database 290. Thus, content database 290 provides an example of a network-accessible storage device system which stores data for providing a plurality of location-specific digital stories related to a common theme at a plurality of locations. In some embodiments, computers 218 are used by content curators associated with a plurality of venues, to provide, manage, and update the digital story content associated with location-specific digital stories associated with the venues, which is stored in a content database 290.

In some embodiments, users of mobile devices, such as smart phones 300A and 300B, capture digital images during a digital story experience at one or more locations. In some embodiments, the captured digital images are uploaded and stored in the customer database 288.

Content database 290 stores data which identifies the geographic locations associated with location-specific digital stories that can be provided using the system depicted in FIG. 2. The geographic location data can use, for example, GPS coordinate boundaries of an area, such as a geofence, or object identifying feature points in images captured in an area. The geographic location data can also use one or more identifiers for wireless communications antennas, which are located in the geographic area associated with the location-specific digital story.

In some embodiments, the content database 290 also stores guidance information, which is used to suggest additional locations for digital story experiences that may be of interest to users, and to guide them to the suggested locations. In some embodiments, the guidance information also provides guidance to locations which are likely to be considered to be good "photo spots" by the particular user of one of the smart phones 300A, 300B. In some embodiments, the guidance information includes at least one image related to the suggested location. For example, the guidance can include a photo of a particular object, along with a map or an audio or text message that provides a general direction, or other clues, for locating the object. In some embodiments, the guidance can also include text or graphics which instruct the user to capture an image of their group near the object, and to upload the captured image to the service provider 280.

In some embodiments, guidance for suggested digital story experience locations, or guidance for capturing images at suggested locations, is provided in a manner so as to dynamically alter the experience responsive to user-captured images or other input received from the user during the digital story experience. In this way, the digital story experience automatically adapts to a particular user's situation and conditions. For example, an uploaded digital still image captured by a user at one point in the digital story experience can indicate that the user is accompanied by children. This can result modifications to the digital story experience in order to be more suitable for a younger audience. In another example, an uploaded digital still image captured by a user can indicate that it is raining or snowing. As a result, the digital story experience can be tailored to indoor venues.

The computer system 286 includes a processor 292, which can be used to analyze the pixel data of some of the customer images which are uploaded and stored in the customer database 288. For example, in some embodiments the processor 292 can analyze the pixel data in order to detect faces in one or more customer images using a variety of known face detection algorithms. In some embodiments, the face detection algorithm determines the number of faces that can be detected in an image, in order to determine how many people are depicted in the image. In some embodiments, the face detection algorithm determines if the detected faces are female faces or male faces. In some embodiments, the face detection algorithm determines the approximate ages of the people whose faces have been detected. It will be understood that the term approximate age, as used herein, relates to categorizing one or more faces into broad, age-related categories. These approximate age categories can include, for example, babies, young children, teens, younger adults, and older adults (i.e. senior citizens).

In some embodiments, the processor 292 in the computer system 286 can analyze the pixel data of some of the customer images in order to determine whether one or more landmarks are depicted in the images. Such image recognition algorithms are used, for example, as part of the Google Goggles™ Application (APP) for the Android mobile platform, which is available from Google, Mountain View, Calif.

In some embodiments, the processor 292 in the computer system 286 creates the information needed to provide a unique photo product for a particular user of one of the smart phones 300A, 300B by incorporating images captured by the user during one or more digital story experiences with pre-stored information, such as professional images and textual descriptions. This enables a photo product to be automatically created by placing the user-captured images in predetermined locations in the photo product, so that they are associated with the pre-stored information. For example, a first image captured by the user near the Lincoln Memorial in Washington D.C. can be associated with pre-stored information which describes the presidency of Abraham Lincoln and provides an image related to his Gettysburg Address speech. A second image, captured by the user near the White House, can be associated with pre-stored information that describes or depicts the current president. This enables a photo product to be automatically produced using the user-captured images at two different locations, along with the pre-stored information associated with the two different locations.

In some embodiments, the processor 292 in the computer system 286 modifies the appearance of one or more of the captured digital images, so that it has a more suitable appearance when incorporated into the photo product. In some embodiments, faces in the captured digital image can be detected, and the processor 292 can crop the digital image to enlarge the size of the faces and remove some of the distracting background surrounding the face.

In some embodiments, captured digital images can be processed by the processor 292 to provide a different image appearance. For example, captured digital images can be processed so that the newly captured images appear to be older photographs, such as daguerreotypes, so that they have a more suitable appearance when positioned in a photo product in association with an image related to the Gettysburg Address. As another example, the captured digital images can be processed to provide an image having a different color tint, contrast, or external shape, so that it has a more suitable appearance when positioned in a photo product as part of an advertisement for a product or service. As another example, the captured digital images can be processed to provide a cartoon effect or a coloring book effect so that they have a more suitable appearance when positioned in a children's photo product in association with pre-stored cartoons or as part of a page which provides a "coloring book" for a child.

In some embodiments, captured digital images can be processed by the processor 292 to provide a different image appearance in response to the image content of the captured image. For example, the processor 292 can determine the location of multiple faces within the image and automatically crop the captured digital image using different aspect ratios for different captured images in order to produce a more suitable appearance in the photo product.

In some embodiments, the captured digital images can be processed by the processor 292 to provide a different image appearance in response to the location where the image was captured. For example, the processor 292 can provide a "cartoon" effect for images captured in a particular location, such as images captured in a particular park or playground.

In some embodiments, the captured digital images can be processed by the processor 292 to provide a different image appearance in response to both the image content of the captured image and the location where the image was captured. For example, the processor 292 can provide a color-based object extraction algorithm (e.g. "green screen" effect") on images captured in a particular location when the processor 292 can determine that a background area of the captured image is a predetermined color (e.g. green).

In some embodiments, the communications network 250 enables communication with a fulfillment provider 270. The fulfillment provider 270 produces and distributes enhanced photo products. The fulfillment provider 270 includes a fulfillment web server 272, and a fulfillment computer system 276 that further includes a commerce manager 274 and a fulfillment manager 275. Fulfillment requests received from service provider 280 are handled by commerce manager 274 initially before handing the requests off to fulfillment manager 275. Fulfillment manager 275 determines which equipment is used to fulfill the ordered good(s) or services such as a digital printer 278 or a DVD writer 279. The digital printer 278 represents a range of color hardcopy printers that can produce various photo products, including prints and postcards. The hardcopy prints can be of various sizes, including "poster prints", and can be sold in frames. The DVD writer 279 can produce CDs or DVDs, for example PictureCDs, having digital still and video images and application software for using the digital images.

After fulfillment, the photo products are provided to the user of the smart phones 300A, 300B, or to a recipient designated by the user of the smart phones 300A, 300B. In some embodiments, the photo products are provided using a transportation vehicle 268. In other embodiments, the photo products are provided at a retail outlet, for pickup by the user of the smart phones 300A, 300B, or by a designated recipient.

In some embodiments, system 214 also includes one or more kiosk printers 224 which communicate with the communication network 250 and service provider 280 via a communication service provider (CSP) 222. This enables printed photo products, created by the service provider 280 using digital images captured by smart phones 300A, 300B, to be provided at retail establishments. The retail establishments, which can be for example gift shops, may be located at or near some of the locations where the location-specific digital story experiences are provided. In some embodiments, the user of the smart phones 300A, 300B receives the photo product at a discount, or free of charge, in order to encourage the user to enter the store where they will potentially purchase other items. In some embodiments, the photo product includes advertising of merchants which are located near the location of the fulfillment provider 270 or the kiosk printer 224.

In some embodiments, the service provider 280, or the fulfillment provider 270 can create examples of various photo products that can be provided by the fulfillment provider 270. The examples can be communicated to the smart phone 300 or the customer computer 218, where the examples can be displayed to the user.

In some embodiments, the customer database 288 at the service provider 280 stores user billing information. The billing information can include a payment identifier for the user, such as a charge card number, expiration date, user billing address, or any other suitable identifier. In some embodiments, the customer database 288 also provides long-term storage of the uploaded images for some or all of the users. In some embodiments, stored user images and digital story content is accessible (e.g., viewable) via the Internet by authorized users.

When a photo product is purchased by the user of the smart phones 300A, 300B, the service provider account manager 284 can communicate with a remote financial institution (not shown) to verify that the payment identifier (e.g., credit card or debit card number) provided by the customer is valid, and to debit the account for the purchase. Alternatively, the price of the photo product can be added to the user's monthly bill paid to the service provider 280 or to their mobile phone operator.

It will be understood that in some embodiments, the functions of the service provider 280 and the fulfillment provider 270 can be combined, for example, by using a common web server for both web server 282 and web server 272 or by combining the functions of the account manager 284, the commerce manager 274, and the fulfillment manager 275. It will be understood that in some embodiments, the customer database 288 or the content database 290 can be distributed over several computers at the same physical site, or at different sites.

With respect to FIG. 1, any of various combinations of the components of FIG. 2 may form all or part of the various components of FIG. 1, according to respective various embodiments of the present invention. For example, in some embodiments, the system 100 corresponds only to the smart phone 300A or the smart phone 300B. In other embodiments, the system 100 corresponds to the service provider 280, where the processor 292 may correspond to the data processing device system 110, the databases 288 and 290 maybe stored in the memory device system 130, the account manager and web server may be applications stored in the memory device system 130, and the communication network 250 may interface with the input-output device system 120. In some embodiments, the system 100 corresponds to the smart phone 300A and the service provider 280, such that, for example, the CPU of the smart phone 300A and the processor 292 both form part of the data processing device system 110. In some embodiments, the system 100 corresponds to the fulfillment provider 270. In some embodiments, the system 100 corresponds to the entirety of the system 214. Accordingly, it can be seen that the present invention is not limited to any particular correspondence configuration between the system of FIG. 1 and the system of FIG. 2. The same is true with respect to any particular correspondence configuration between the system of FIG. 1 and the system of FIG. 3, which will now be discussed.

Figure 3:
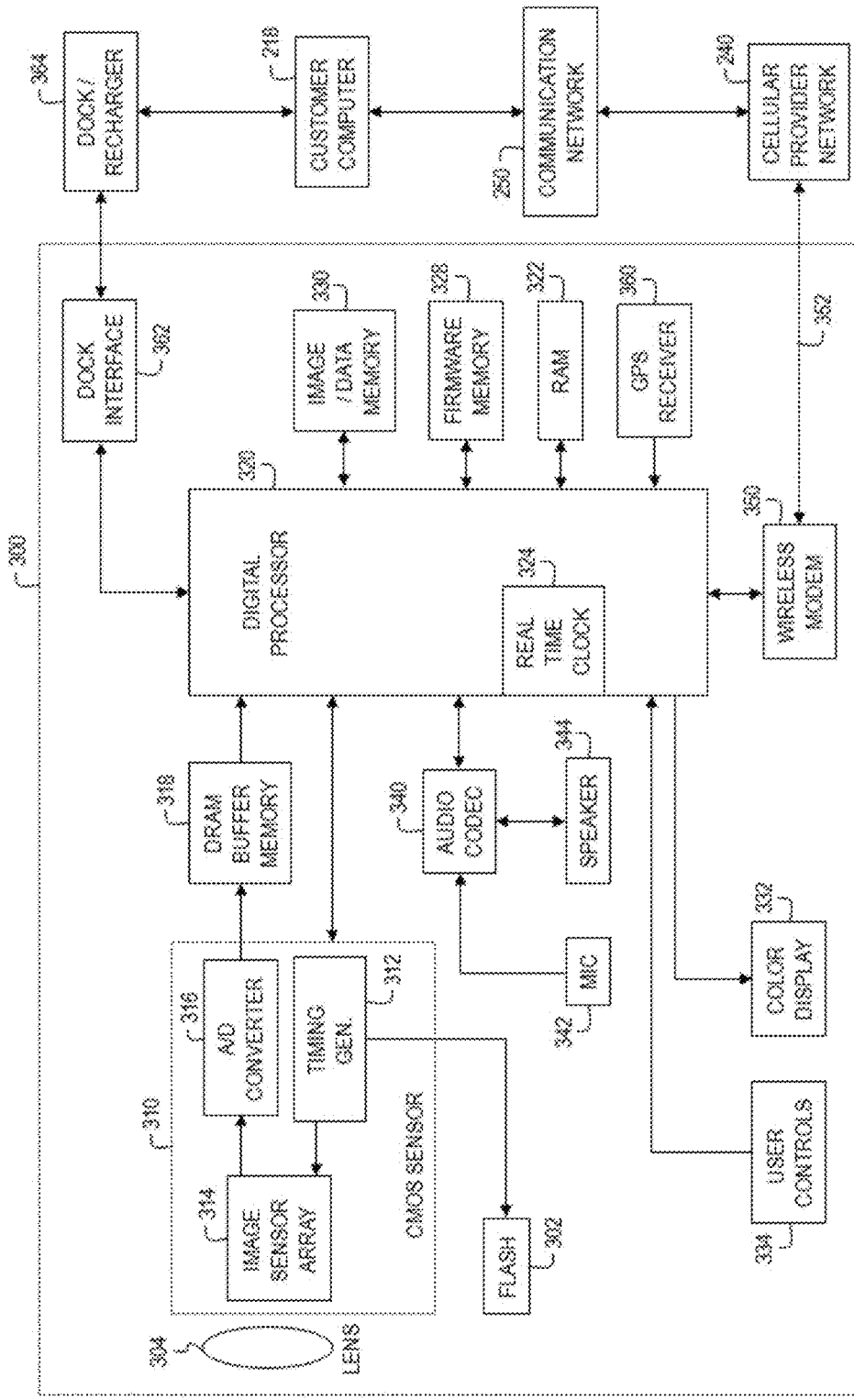
FIG. 3 is a block diagram of a smart phone, which may be all or part of the system of FIG. 1, according to some embodiments of the present invention.

FIG. 3 depicts a block diagram of a smart phone 300 used in the system of FIG. 2, according to some embodiments of the present invention. It will be understood that other types of mobile devices, such as tablet computers and wireless digital cameras, can be used in the system described in reference to FIG. 2.

In some embodiments, the smart phone 300 is a portable, battery operated device, small enough to be easily handheld by a user. The smart phone 300 can utilize an operating system such as the iOS operating system developed by Apple Inc, Sunnyvale, Calif. or the Android mobile platform, developed by Google, Mountain View, Calif. The operating system can be stored in firmware memory 328 and utilized by digital processor 320 (which may, e.g., form at least part of the data processing device system 110 in FIG. 1). The smart phone 300 can run applications (i.e. "apps") which are pre-installed when the smart phone is purchased, or are downloaded from the service provider 280. The digital processor 320 may use, for example, the Android software stack, which includes a Linux-based operating system, middleware, and applications. This permits additional software applications ("apps") to be downloaded from the service provider 280, stored in the firmware memory 328, and used to provide various functions, including the digital story experiences to be described in reference to FIG. 4.

The smart phone 300 includes a camera module including a lens 304 which focuses light from a scene (not shown) onto an image sensor array 314 of a CMOS image sensor 310. The image sensor array 314 can provide color image information using the well-known Bayer color filter pattern. The image sensor array 314 is controlled by timing generator 312, which also controls a flash 302 in order to illuminate the scene when the ambient illumination is low. The image sensor array 314 can have, for example, 2560 columns×1920 rows of pixels.

The smart phone 300 can also capture video clips by summing multiple pixels of the image sensor array 314 together (e.g. summing pixels of the same color within each 4 column×4 row area of the image sensor array 314) to create a lower resolution video image frame. The video image frames are read from the image sensor array 314 at regular intervals, for example using a 30 frame per second readout rate.

The analog output signals from the image sensor array 314 are amplified and converted to digital data by the analog-to-digital (A/D) converter circuit 316 in the CMOS image sensor 310. The digital data is stored in a DRAM buffer memory 318 and subsequently processed by a digital processor 320 controlled by the firmware stored in firmware memory 328, which can be flash EPROM memory. The digital processor 320 includes a real-time clock 324, which keeps the date and time even when the smart phone 300 and digital processor 320 are in their low power state. The digital processor 320 produces digital images that are stored as digital image files using image/data memory 330. The phrase "digital image" or "digital image file", as used herein, refers to any digital image or digital image file, such as a digital still image or a digital video file.

The processed digital image files are stored in the image/data memory 330, along with the date/time that the image was captured provided by the real-time clock 324 and the location information provided by a location determination unit, such as GPS receiver 360.

In some embodiments, the digital processor 320 performs color interpolation followed by color and tone correction, in order to produce rendered sRGB image data. In some embodiments, the digital processor 320 can also provide various image sizes selected by the user. In some embodiments, rendered sRGB image data is then JPEG compressed and stored as a JPEG image file in the image/data memory 330. In some embodiments, the JPEG file uses the so-called "Exif" image format. This format includes an Exif application segment that stores particular image metadata using various TIFF tags. Separate TIFF tags are used to store the date and time the picture was captured and the GPS co-ordinates, as well as other camera settings such as the lens f/number.

In some embodiments, the CMOS sensor 310 is used to capture QR codes or bar codes which are located at a visitor information center or at an experience location. In some embodiments, the captured image of the QR code or the bar code can be used, for example, to determine the URL for an app which is downloaded to the smart phone 300 from the service provider 280 in order to implement some or all of the steps which will be described in relation to FIG. 4, FIG. 5, and FIG. 12. In some embodiments, the captured image of the QR code or the bar code can be used to initiate the purchase of various products or services of interest to the visitor at an experience location.

In some embodiments, the digital processor 320 also creates a low-resolution "thumbnail" size image or "screennail" size image, which can be stored in RAM memory 322 and supplied to a color display 332, which can be, for example, an active matrix LCD or organic light emitting diode (OLED) touch screen display. After images are captured, they can be reviewed on the color LCD image display 332 by using the thumbnail image data.

The graphical user interface displayed on the color display 332 is controlled by user controls 334. The graphical user interface enables the user to control the functions of the smart phone 300, for example, to make phone calls, to launch and control apps, to capture images, and to send and view text messages, email messages and videos. User controls 334 can include a touch screen overlay on the color display 332, as well as buttons, keyboard switches, rocker switches, or joysticks. In some embodiments, the user controls 334 can include voice recognition or image based gesture recognition.

An audio codec 340 connected to the digital processor 320 receives an audio signal from a microphone 342 and provides an audio signal to a speaker 344 and a headphone jack (not shown). These components can be used both for telephone conversations and to record and playback digital audio. The digital audio can be played back as part of a digital story experience, to be described later in reference to FIG. 4. In addition, a vibration device (not shown) can be used to provide a silent (e.g., non-audible) notification of an incoming phone call or message, or to inform a user that they have entered a location, such as a geofence, where a digital story experience can be provided.

In some embodiments, a digital audio signal can be provided from the digital processor 320 to the wireless modem 350, which can transmit the digital audio signal over an RF channel 352 using, for example, the well-known Bluetooth protocol. The digital audio signal can be received by a wireless modem in a vehicle audio system (not shown), which can amplify and play the audio using speakers installed in the vehicle. This permits the driver and passengers in the vehicle to listen to the audio that is presented as part of the digital story experience.

In some embodiments, a memory (which may, e.g., form at least part of the memory device system 130 in FIG. 1) in the smart phone 300, such as firmware memory 328, can be used to store a variety of music using standard audio files, such as the well-known MP3 audio format, so that the smart phone 300 serves as a music player. In some embodiments, music files consistent with the theme of the digital story experience can be automatically downloaded from the service provider 280 and stored in firmware memory 328. The music files can then be automatically played when the smart phone 300 is not at a digital story experience location, as will be described later in reference to step 890 in FIG. 12. For example, an MP3 audio file for the song "John Brown's body" can be automatically downloaded when the "Fight for rights" theme is selected, as will be described later in reference to FIG. 6A, since the song "John Brown's body" is consistent with the "fight for rights" theme. As another example, the song "(Get your kicks on) Route 66" is consistent with a digital story experience along historic route 66.

A dock interface 362 can be used to connect the smart phone 300 to a dock/charger 364, which is optionally connected to customer computer 218. The dock/recharger 364 can be used to recharge the batteries (not shown) in the smart phone 300. The dock interface 362 can conform to, for example, the well-know USB interface specification. Alternatively, the interface between the smart phone 300 and the customer computer 218 can be a wireless interface, such as the well-known Bluetooth wireless interface or the well-know 802.11 wireless interface. In some embodiments, the dock interface 362 can be used to transfer data for providing a plurality of location-specific digital stories to the camera phone 300 prior to leaving on a vacation trip.

The digital processor 320 is communicatively connected to a wireless modem 350, which enables the digital smart phone 300 to transmit and receive information via an RF channel 352. The wireless modem 350 communicates over a radio frequency (e.g. wireless) link with the cellular provider network 240, described earlier in reference to FIG. 2, which can utilize, for example, a CDMA network, a 3GSM, a 4 GSM network, or other wireless communication networks. In some embodiments, the wireless modem 350 also communicates using local area wireless interface standards, such as the well-know 802.11 interface standards or the well-known Bluetooth standard.

It will be understood that the functions of digital processor 320, because it may form at least part of the data processing device system 110, can be provided using a single programmable processor or by using multiple programmable processors, including one or more digital signal processor (DSP) devices. Alternatively, the digital processor 320 can be provided by custom circuitry (e.g., by one or more custom integrated circuits (ICs) designed specifically for use in smart phones), or by a combination of programmable processor(s) and custom circuits, just like the data processing device system 110. It will be understood that communicative connections between the digital processor 320 and some or all of the various components shown in FIG. 3 can be made using a common data bus. For example, in some embodiments the connection between the digital processor 320, the DRAM buffer memory 318, the image/data memory 330, and the firmware memory 328 can be made using a common data bus.

FIG. 4 is a flow diagram depicting steps for providing location-specific digital story experiences related to a common theme at different locations, according to some embodiments of the present invention. In some embodiments, the steps are performed by the service provider 280 in FIG. 2. In other embodiments, some or all of the steps are performed by the smart phone 300 in FIG. 3.

In store location specific stories step 400 of FIG. 4, data for a plurality of location-specific digital stories related to at least one common theme is stored on a network-accessible storage device system, such as content database 290 in FIG. 2. In some embodiments, the digital stories are stored in association with GPS information, such as geofences, which indicate the locations where the digital stories are to be presented. A number of variations of the digital story for the same theme are stored for each location. This is done because some users at any particular location will have already experienced digital stories for the same theme at one or more other locations, while other users will experience their first digital story for the theme at this particular location.

In some embodiments, location-specific digital stories are stored for a plurality of different themes in the content database 290. For example, the plurality of themes for locations in the Rochester, N.Y. region could include digital stories for a first theme related to the "Fight for Rights", for a second theme related to "Life along the Erie Canal", and for a third theme related to "Winemaking in the Finger Lake region".

Figure 6:
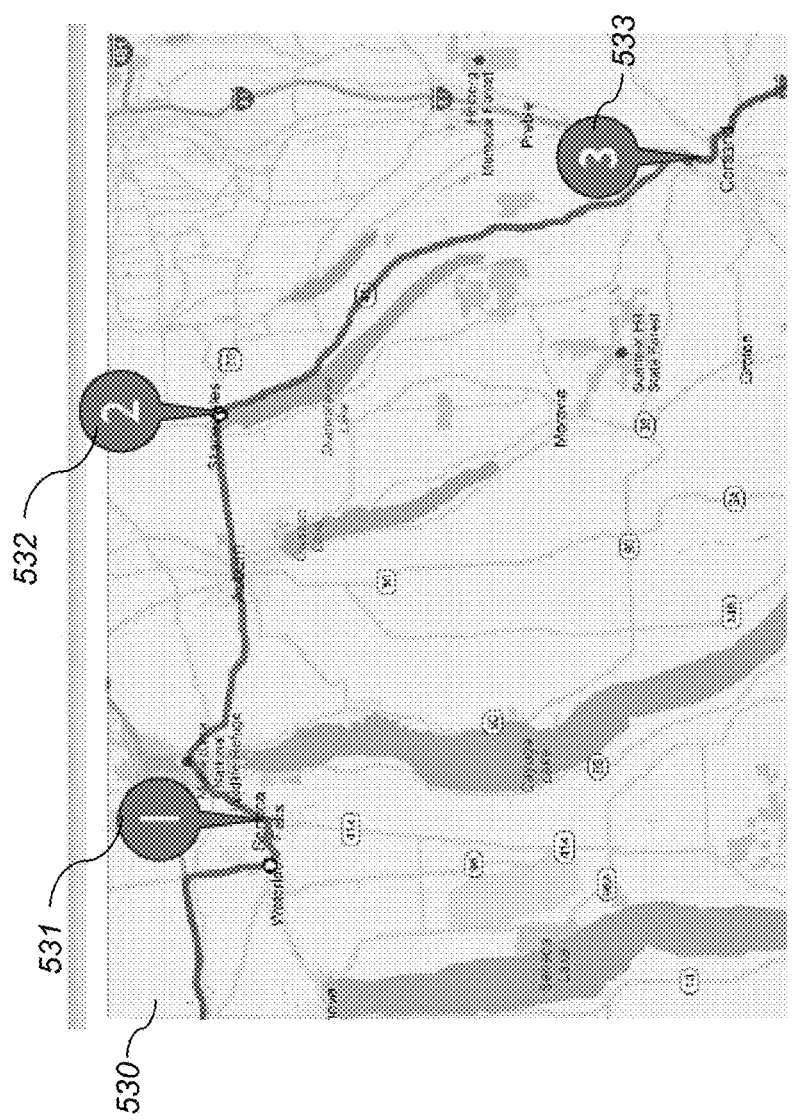
FIG. 6 is an example of a map depicting different locations at which location-specific digital story experiences related to a common theme can be provided, according to some embodiments of the present invention.

FIG. 6 is an example of a map 530 depicting different experience locations 531, 532, and 533 at which location-specific digital story experiences related to a common theme can be provided, according to some embodiments of the present invention. In this example, the common theme is a "fight for rights" theme. The map identifies three locations in upstate New York, including experience location "1" 531 near Seneca Falls, experience location "2" 532 near Skaneateles, and experience location "3" 533 near Cortland.

In store user profiles step 405 of FIG. 4, profiles are developed for a plurality of users of mobile devices, such as the users of smart phones 300A, 300B in FIG. 2, and stored in customer database 288. The profiles indicate whether each user has been presented with one or more digital stories at one or more digital story experience locations. If a user has been presented with a digital story, the theme, location, and date/time of each digital story presentation are recorded in their user profile.

In some embodiments, the user profile includes information derived from responses given by the user during their digital story experiences. For example, the user may have been asked to select a particular character from a plurality of characters that could be used to present stories. The user profile stores data which identifies the user-selected character, so that the same character can automatically be featured in a related digital story experience at another location.

In some embodiments, the user profile is stored in a memory of the smart phone 300, such as image/data memory 330 or firmware memory 328.

In determine user location step 410, the current location of the mobile device for a particular user is determined. This can be done, for example, by using the GPS receiver 360 in the smart phone 300 (see FIG. 3) to determine the GPS coordinates of the smart phone 300, and by using the digital processor 320 in the smart phone 300 to communicate the GPS coordinates to the service provider 280 using the wireless modem 350. It will be understood that in some embodiments, the GPS coordinates of experience locations can be provided by the service provider 280 and stored in a memory of the smart phone 300 (such as image/data memory 330 or firmware memory 328) so that the digital processor 320 in the smart phone 300 can determine if the mobile phone 300 is at an experience location.

In at an experience location test 415, a determination is made as to whether the user's current location corresponds to one of the plurality of locations at which location-based digital story experiences can be provided by system 214 (yes to test 415) or is outside this plurality of locations (no to test 415). This can be tested by determining, for example, if the user's smart phone 300 has entered into the geofence for a particular experience location. In some embodiments, this determination is made by service provider 280 using processor 292. In some embodiments, this determination is made by smart phone 300 using digital processor 320.

If the user's current location does not correspond to one of the plurality of story-telling experience locations (no to test 415), the process proceeds to provide directions step 420. In provide directions step 420, directions are provided in order to direct the user to one or more nearby experience locations where a digital story experience can be provided. For example, the map shown in FIG. 6 can be used to provide directions to the user. In some embodiments, standard mapping programs, such as Google Maps, already installed on the smart phone 300 can be used to provide directions to the user. In some embodiments, images showing a landmark can be used to provide directions to the user.

In some embodiments, even though the user's current location does not correspond to one of the plurality of story-telling experience locations (no to test 415), the smart phone 300 provides a menu of themes for location-specific stories that can be provided at nearby experience locations, and the user is permitted to select a specific theme. Once the user selects the specific theme, the user is directed to one or more nearby locations associated with the user-selected theme. For example, the user may select a specific theme using their smart phone 300 before they begin driving their vehicle to a nearby experience location associated with the theme they have selected. As the user drives their vehicle, the smart phone 300 can direct the user to one of the nearby experience locations by displaying a map and providing audio guidance for which roads to take and where to turn. When the vehicle reaches one of the experience locations associated with a digital story (e.g. when the vehicle enters a geofence), the associated digital story can then be automatically provided, for example by presenting an audio signal which plays over the vehicle's stereo audio system using a Bluetooth connection between the smart phone 300 and the vehicle's stereo audio system.

If the user's current location does correspond to one of the plurality of story-telling experience locations (yes to test 415), the process proceeds to select location-specific story step 425. In select location-specific story step 425, one of a plurality of possible location specific digital stories is selected and provided to the user's mobile device, for example by transmitting digital data for the selected digital story from the service provider 280 to the user's smart phone 300. In some embodiments, the plurality of possible location specific digital stories is stored in a memory of the smart phone 300 (such as image/data memory 330 or firmware memory 328) at an earlier time, and is selected by the digital processor 320.

FIG. 5 is a flow diagram depicting steps for the select location-specific story step 425 in FIG. 4, according to some embodiments of the present invention. In access user profile step 500, the stored user profile for the user is read from a memory which stores profiles for a plurality of users of mobile devices, such as customer database 288 in FIG. 2. The stored user profile provides the user's history concerning stories that the user viewed at earlier times. In viewed earlier story test 505, a determination is made as to whether the user profile indicates that the user has already viewed a location-specific digital story at another experience location which relates to the theme of a digital story available at the current experience location.

If the user has not viewed a location-specific story at another experience location at an earlier time (no to test 505), in provide first digital story step 510, data for a first digital story which can be presented at the user's current location is provided. In some embodiments, the data for the first digital story is transmitted from the service provider 280 to the user's mobile device, such as smart phone 300A.

In some embodiments, the first location-specific story is automatically initiated when the user reaches the location associated with the story, for example when the user enters the geofence for the particular digital story experience location. In other embodiments, the location-specific story is determined by presenting to the user a menu which permits the user to select one of a plurality of first digital stories that can be provided at the current location. The plurality of stories can include stories on the same general theme (e.g. a women's rights theme) which are narrated by different characters, such as a young girl character and an older woman character. The plurality of stories can also include stories having different themes (e.g. a first story having a women's rights theme and a second story related to the Erie Canal).

In some embodiments, the first location-specific story is selected responsive to demographic information stored in the user profile. For example, in some embodiments the user profile can store the preferred (e.g., native) language of the user, and the user profile can be accessed in order to provide a first digital story which is presented in the preferred language of the user. In some embodiments, the user profile can store the approximate age of the user, and the user profile can be accessed in order to provide a first digital story which is appropriate for the age of the user. For example, different first digital stories may be provided to children, teenagers, adults, and senior citizens.

FIG. 7A depicts an example of a user interface screen for selecting a theme for location-specific stories using color display 332 of smart phone 300, according to some embodiments of the present invention. Story greeting window 612 includes a user photo 614, which can be displayed using image data from the stored user profile for the particular user of the smart phone 300. Story greeting window 612 also includes a message window 616 which asks the user to select one of the stories in story selection window 620.

Story selection window 620 permits the user to select a wine story 624 having wineries as the theme, as depicted using a winery story image 622. Story selection window 620 also permits the user to select an Amelia story 634 having the fight for rights as the theme, which is told by a historical figure named Amelia Jenks Bloomer, as depicted using Amelia story image 632.

Returning to FIG. 5, in introduce theme & character step 515, the theme and character of the first digital story are introduced, in order for the user to understand the overall context of the story. For example, if the theme of the story is the women's rights movement, the first digital story can discuss the historic context of the story and provide background information on the character who is narrating the story.

FIG. 7B depicts a user interface screen that begins to introduce the theme and character of the Amelia fight for rights story, which is one of the themes that can be selected by the user, using the user interface screen depicted in FIG. 7A. The user interface screen depicted in FIG. 7B includes the Amelia story image 632, since the story will be told by the historical figure Amelia Jenks Bloomer. The user interface screen depicted in FIG. 7B also includes a story introduction window 640, which provides text that introduces the theme and the main character of the story, who is named Amelia. It will be understood that the digital story told by Amelia can include still and video images, as well as audio narration, sound effects, and music. For example, in some embodiments the text in story introduction window 640 could be provided as an audio narration.

The user interface screen depicted in FIG. 7B also includes a map 642 depicting other locations where the user can view location-specific stories concerning the same theme (e.g. the fight for rights theme). The user interface screen depicted in FIG. 7B also includes a "Follow Amelia" icon 646 which the user can select to continue experiencing Amelia's story, and an "Another theme" icon 648 which the user can select in order to view a menu that permits the user to select another story theme or character.

Returning to FIG. 5, if the user has already viewed a location-specific story at another location (yes to test 505), in provide second digital story step 520, data for a second digital story which can be presented at the user's current location is provided. In some embodiments, the data for the second digital story is transmitted from the service provider 280 to the user's mobile device, such as smart phone 300A. In some embodiments, the data for the second digital story is downloaded at an earlier time (e.g. when the data for the first digital story was downloaded at another location) and stored in a memory of the user's mobile device (e.g. image/data memory 330 or firmware memory 328) in the smart phone 300 in FIG. 3) so that the data for the second digital story is immediately available when the user moves to the experience location associated with the digital story (i.e. the current location).

In continue theme & character step 525, the theme and character which were used in the first digital story are continued, so that the digital story provided at the current location builds on the story already provided at the earlier experience location or locations. For example, if the theme of the story relates to the development of the Eric Canal, the second digital story can describe how food and materials which were loaded onto the barge at a different location, which was visited by the user at an earlier time, are being unloaded from the same barge at the current location, so that the food and materials can be sold at a store near the current location.

Returning to FIG. 4, in present story step 435, the location-specific digital story selected in step 425 is presented to the user. The digital story can be presented to the user using a variety of story-telling methods, such as audio stories, text-based stories, video stories, and augmented-reality stories. In some embodiments, the user selects a preferred story-telling method from a menu offering a variety of choices, which is stored in their user profile during store user profiles step 405. For example, the user can select a text based story, rather than a story that includes audio, if they are hearing-impaired or concerned about distracting others. Alternatively, if the user is driving a vehicle, the digital story can be told primarily using audio narration, sound effects, and music. However, still and video images could also be provided, for viewing by passengers in the vehicle.

It will be understood that in some embodiments, the presentation of a digital story is initiated when the user's mobile device, such as smart phone 300, enters a geofence and continues even if the mobile device leaves the geofence, until the presentation is completed (e.g. until a complete audio clip has been played). In some other embodiments, the presentation is terminated when the mobile device leaves the geofence. In some embodiments, the digital story associated with the geofence can include associated data which indicates whether or not the digital story presentation should continue if the mobile device leaves the geofence.

In some embodiments, the digital story-telling method can be automatically selected by a processor in system 214 (such as processor 292 at service provider 280 or digital processor 320 in smart phone 300) based on measurements performed by one of the mobile devices, such as smart phone 300. For example, in some embodiments the digital processor 320 in the smart phone 300 can determine the user's speed from measurements made by the GPS receiver 360. If the user's average speed is greater than a threshold (e.g. greater than 10 miles per hour), the story-telling method can be automatically switched to an audio mode, since the user is likely in a moving vehicle. In some embodiments, the digital processor 320 in the smart phone 300 can determine the ambient noise level from measurements made using the mic 342 and audio codec 340. If the noise level is greater than a threshold (e.g. greater than 90 dB), the story-telling method can be automatically switched to a mode which displays text subtitles, since it may be difficult for the user to hear audio messages.

Figure 8A:
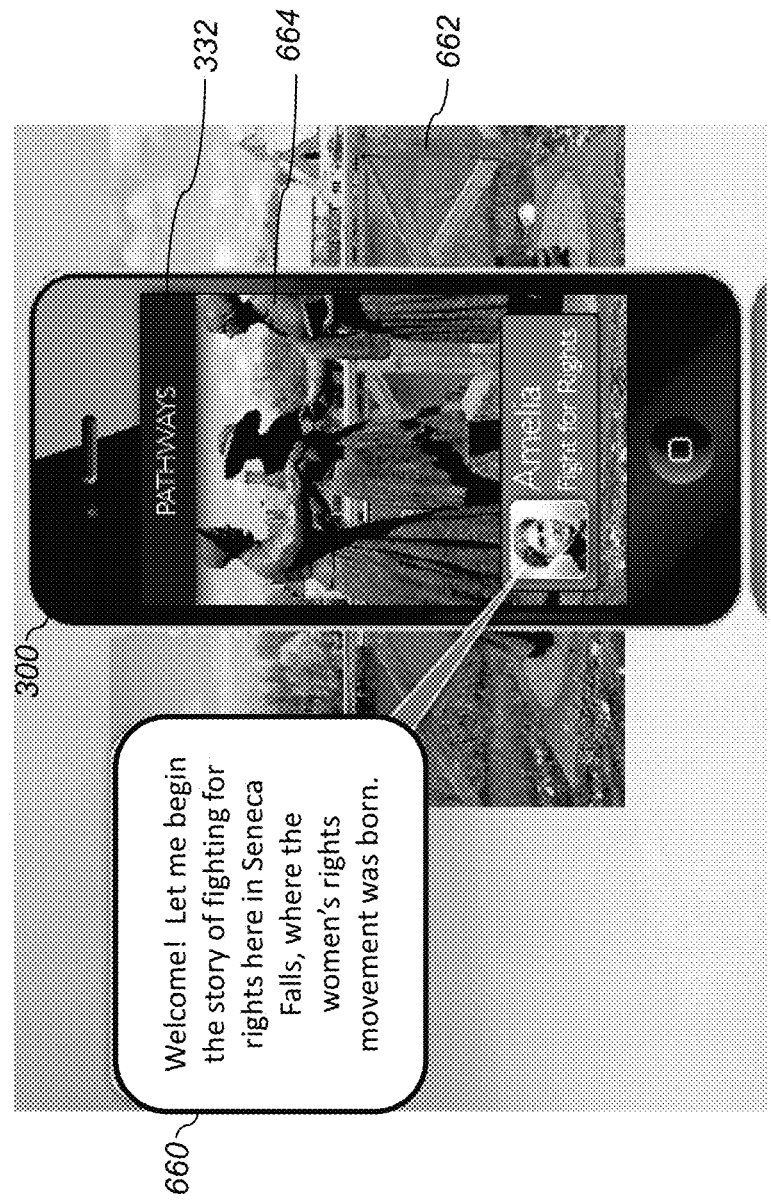
FIG. 8A depicts a user interface screen for presenting a first location-specific digital story associated with a first theme at a first geographic location, according to some embodiments of the present invention.

FIG. 8A depicts a user interface screen for presenting a first location-specific digital story associated with a first theme at a first geographic location, according to some embodiments of the present invention. The user interface screen example shown in FIG. 8A is used to present a first location-specific digital story 660 associated with a particular theme (i.e. the fight for rights) at the Seneca Falls experience location "1" 531 shown in FIG. 6. The first location-specific story is presented when the user selects the "Follow Amelia" icon 646 in FIG. 7B, and begins by assuming that the user has not yet viewed any digital stories associated with the fight for rights theme. It will be understood that the digital story 660 can be provided using one or more of audio, text, graphics, still images, video images, and augmented-reality images.

In some embodiments, an augmented reality character is used to present at least a portion of the digital story. For example, when the user aims the camera lens 304 of their smart phone 300 (see FIG. 3) toward the statues in the center of scene 662, augmented reality techniques can be used to cause the mobile device to display one or more augmented reality images of Amelia (or some other historical character in other digital stories) along with the image or images captured by the mobile device to make the statue of Amelia 664 appear to "come to life" on the color display 332 of the user's smart phone 300 or other mobile device. The augmented reality character can be used to narrate the story, or to perform an action described in the story. The augmented reality character can be provided, for example, using the Aurasma augmented reality software provided by HP. Aurasma can be utilized by iPhone and Android apps in order to recognize images, symbols and objects captured by the camera in the smart phone. The captured images can be paired up with overlaid videos, animation, 3D still images or other date sources, known as "Auras", and displayed to the user.

Figure 8B:
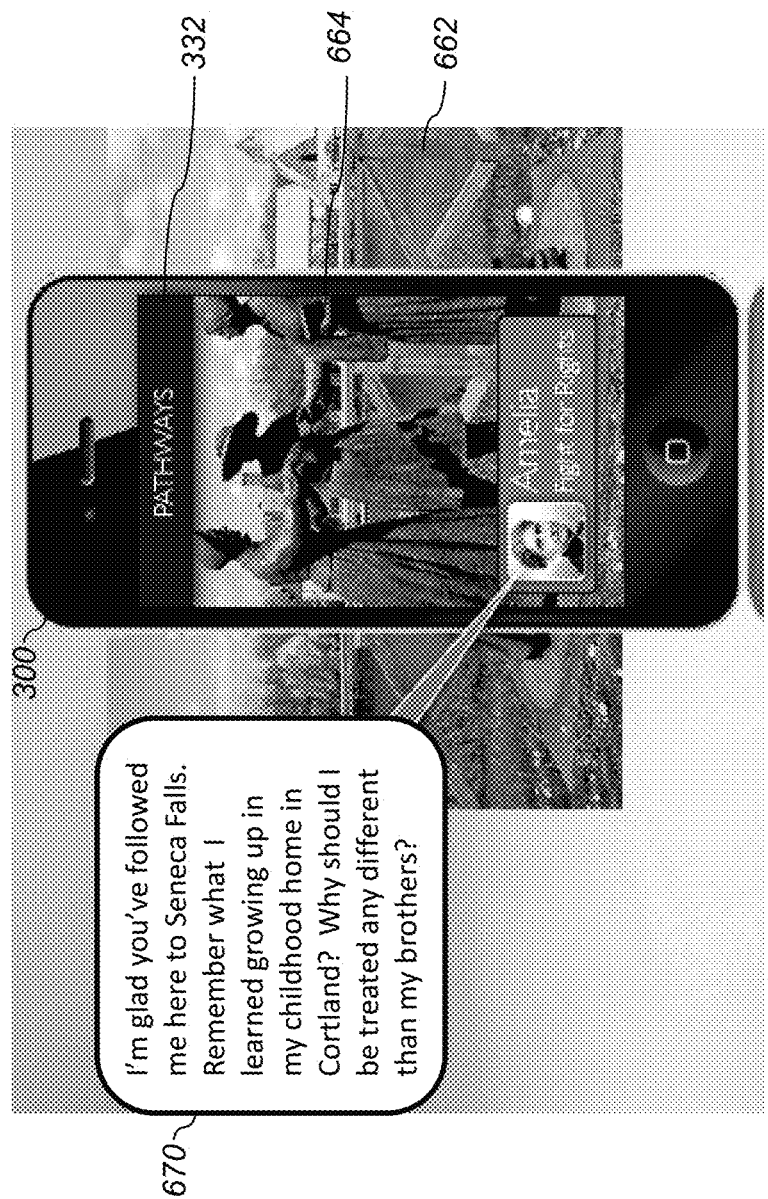
FIG. 8B depicts a user interface screen for presenting a second location-specific digital story associated with the first theme at the first geographic location, according to some embodiments of the present invention.

FIG. 8B depicts a user interface screen for presenting a second location-specific digital story associated with the first theme at the first geographic location, according to some embodiments of the present invention. The user interface screen example shown in FIG. 8B is used to present a second location-specific digital story 670 associated with the same theme (i.e. the fight for rights) at the same Seneca Falls experience location "1" 531 shown in FIG. 6. The second location-specific story provides a continuation of a digital story that the user had viewed at an earlier time at a different experience location (e.g. the Cortland experience location "3" 533 in FIG. 6). It will be understood that the second location-specific digital story 670 uses an audio presentation, a video presentation, or a text presentation (which begins "I'm glad you've followed me here to Seneca Falls") which is different than the first location-specific digital story 660 (which begins "Welcome! Let me begin the story of fighting for rights here in Seneca Falls") described earlier in reference to FIG. 8A.

Figure 9:
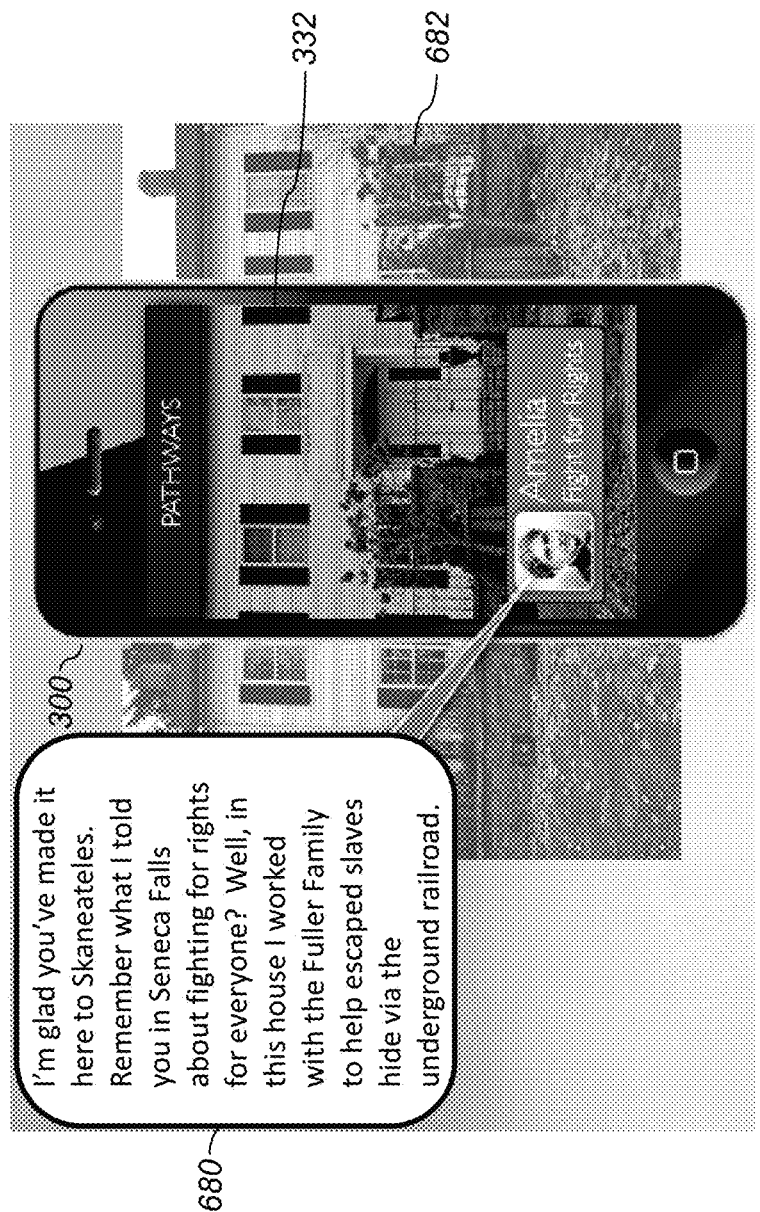
FIG. 9 depicts a user interface screen for presenting a location-specific digital story associated with the first theme at a second geographic location, according to some embodiments of the present invention.

FIG. 9 depicts a user interface screen for presenting a location-specific digital story associated with the first theme at a second geographic location, according to some embodiments of the present invention. The user interface screen example shown in FIG. 9 is used to present a location-specific digital story 680 associated with the same theme (i.e. the fight for rights) at a second experience location, which is the Skaneateles experience location "2" 532 in FIG. 6. This location-specific digital story provides a continuation of the digital story that the user began in Seneca Falls experience location "1" 531. The digital story 680 relates to a house 682 which is historically important, since it was part of the underground railroad which allowed slaves to escape from the United States to Canada. In some embodiments, when the user positions the camera lens 304 of their smart phone 300 (see FIG. 3) towards the house 682, augmented reality techniques can be used to reveal a virtual interior of the house 682 on the color display 332 of the user's smart phone 300. The virtual interior can be used to help demonstrate the historical importance of the house 682, by showing rooms where the Fuller Family lived, and revealing secret areas where slaves could be hidden.

Figure 10:
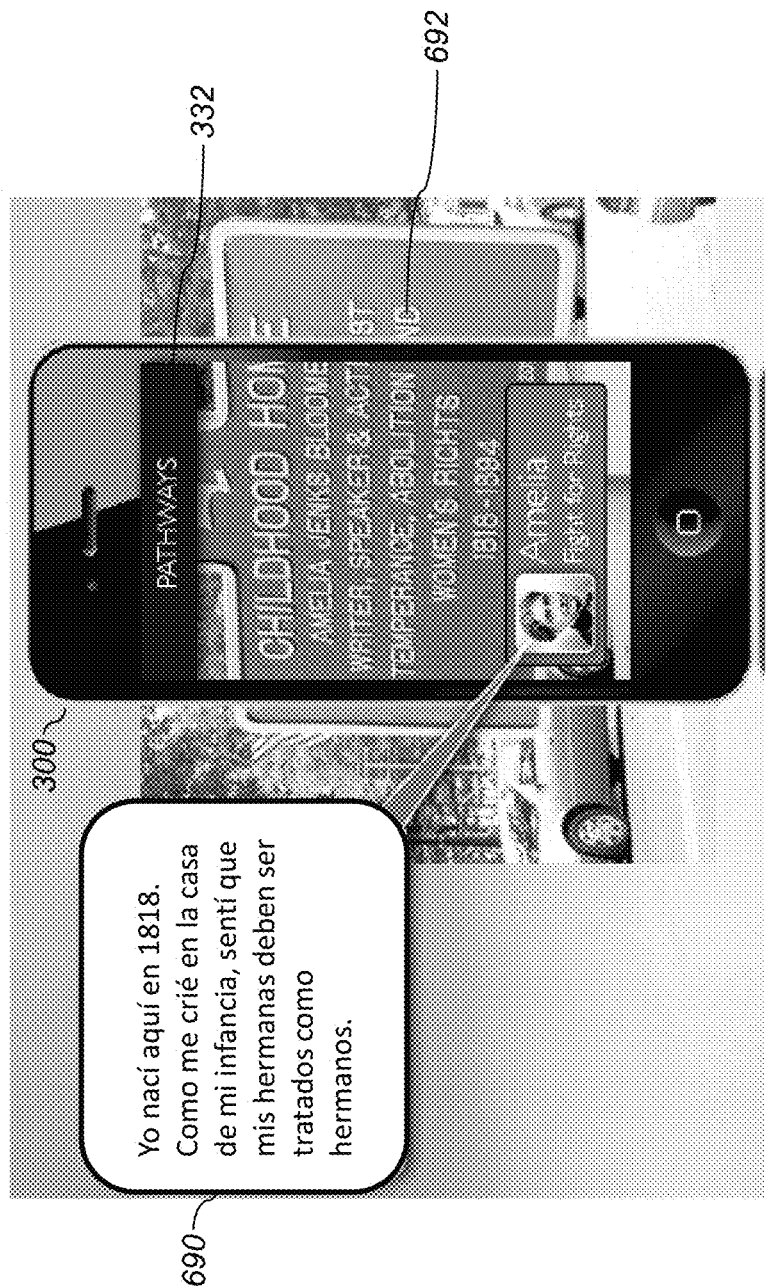
FIG. 10 depicts a user interface screen for presenting a location-specific digital story associated with the first theme at a third geographic location, according to some embodiments of the present invention.

FIG. 10 depicts a user interface screen for presenting a location-specific digital story associated with the first theme at a third geographic location, according to some embodiments of the present invention. The user interface screen shown in FIG. 10 is used to present a location-specific digital story 690 associated with the same theme (i.e. the fight for rights) at a third experience location (i.e. the Cortland location "3" 533 in FIG. 6). In this example, the location-specific digital story 690 is presented in Spanish, since the user profile indicates that this user's preferred language is Spanish. In some embodiments, when the user positions the camera lens 304 of their smart phone 300 (see FIG. 3) towards the sign 692, the English words on the sign can be recognized. The message on the sign can be read to the user in their preferred (e.g. native) language, using speaker 344 in smart phone 300 (see FIG. 3). In some embodiments, a virtual reality sign in the user's native language can be displayed on the color display 332 of the user's smart phone 300.

Returning to FIG. 3, in update user profile step 440, the user profile is updated based on the user's digital story experience. For example, the user profile can be updated to indicate that the user has been presented with the first digital story of a particular theme (e.g. the fight for rights theme) at the first location (e.g. the Seneca Falls experience location "1" 531 in FIG. 6). In some embodiments, the user is asked to respond to questions as a digital story is presented (for example, whether they would like to hear more about particular topics), and their answers are used to update their stored user profile (for example, to indicate their interest in the particular topics).

In some embodiments, the approximate period of time that the user spends in the location where they have experienced the digital story is recorded, to indicate the user's level of interest in the story location. This information can be used to help select future location-specific digital stories, for example by providing shorter or longer versions of a digital story based on whether the user spent a relatively long time, or a relatively short time, experiencing the current digital story or participating in other activities at the location.

In suggest next experience location step 450 in FIG. 4, a suggested next digital story experience location is provided to the user's mobile device, such as smart phone 300 in FIG. 2. In the some embodiments, the processor 292 in the computer system 286 at the service provider 280 determines the next suggested experience location, based on the user profile which has been updated in step 440. For example, the suggested next experience location (after the user has been presented with the digital story at Seneca Falls experience location "1" 531) could be the Skaneateles experience location "2" 532 or the Cortland experience location "3" 533. In some embodiments, the user of the smart phone 300 can reject the next suggested experience location. In response, the service provider 280 can determine and suggest an alternative next experience location. In some embodiments, the user can be presented with the option of being presented with a digital story on a different theme at the current experience location, or at a nearby experience location. For example, the user could be presented with the option of visiting a nearby experience location associated with the Seneca Wine Trail.

As described earlier, in provide directions step 420, directions are provided in order to direct the user to the suggested next experience location where a digital story can be provided. For example, the map shown in FIG. 6 can be used to provide directions to the suggested next experience location. In some embodiments, the directions are provided by the character chosen by the user (e.g. Amelia) who can describe, in a historic context, the directions to the suggested next experience location.

In some embodiments, the account manager 284 and the customer database 288 in the computer system 286 are used to determine user specific information related to the history of the user's interactions with the system, as well as any previously captured or determined information about the user's experience. For example, in a "vacation trip" scenario, the user may be known to be traveling from a starting location (e.g. their home town) to a particular vacation destination. Further, it may be known that the user has already visited several digital story experience locations and is interested in following a route that will take the user closer to their vacation destination.

In some embodiments, the suggested next experience location can be made based on responses or answers the user conveyed to questions provided by smart phone 300 (e.g., during a digital story). For example, the user can respond to questions about whether they are interested in a next experience related to a different theme, or whether they are interested in visiting specific areas, or are interested in obtaining a meal or lodging in a specific area, or at a specific restaurant or hotel. In some embodiments, the suggested next experience location can be stored and recalled at a later date.

In some embodiments, the suggested next experience location can be based on ambient conditions, such as the current weather, the time of day, or safety related ambient condition information. In some embodiments, ambient condition information (such as whether it is a rainy day) is used to automatically suggest an indoor location from the set of possible next locations. In some embodiments, the time of day can be used, in combination with the operating hours of some experience locations, to avoid suggesting locations that may be closed, or otherwise inaccessible, at the time the user is likely to arrive at the location. In some embodiments, the suggested experience location can be based on avoiding a severe weather storm in the area, or avoiding any fire, crime, or other safety related incident which may have occurred in the vicinity of one or more experience locations.

In some embodiments, the user is asked to capture one or more images of themselves, or their group, during present story step 435. In some embodiments, the processor 292 in the computer system 286 at the service provider 280 determines the next possible image capture location based on the result of analyzing the pixel data of one or more of these user captured images. For example, the captured images can be analyzed to determine whether there are any children depicted in the captured digital image.

In some embodiments, some or all of the steps described in reference to FIG. 4 are provided by the mobile device, such as smart phone 300. In some embodiments, the service provider 280 provides a downloadable software application ("app") over the communication network 250 to the smart phone 300, in order to provide the location-based digital stories. The smart phone 300 is one example of a mobile device that includes a memory, such as image/data memory 330, which serves as a memory for storing digital story content, output devices including a color display 332 and a speaker 344 for outputting digital story content, a GPS receiver 360 which serves as a location determination unit, a digital processor 320 which serves as a data processing system, and a firmware memory 328 which serves as a program memory. The digital processor 320 is communicatively connected to the image/data memory 330, the color display 332, the speaker 344 via the audio codec 340, and the firmware memory 328.

In this example, the instructions provided in the app can control the digital processor 320 in order to store data for providing a plurality of location-specific digital stories related to a common theme at a plurality of locations in the image/data memory 330. The instructions provided in the app can also be used by the digital processor 320 to determine if the current location of the mobile phone 300, provided by GPS receiver 360, corresponds to one of the plurality of locations for the location-specific digital stories.

The instructions provided in the app can also be used by the digital processor 320 to determine if the user of the mobile device has already viewed one of the plurality of location-specific digital stories at a different one of the plurality of locations. The instructions provided in the app can also be used by the digital processor 320 to read digital story content data for a first digital story from the image/data memory 330 and to provide the first digital story content data to one or more of the output devices in the smart phone 300, such as color display 332 and speaker 344, if it is determined that the smart phone 300 has not been used to present one of the plurality of location-specific digital stories at a different one of the plurality of locations. The instructions provided in the app can also be used by the digital processor 320 to read digital story content data for a second digital story from image/data memory 330 and to provide the second digital story content data to one or more of the output devices in the smart phone 300, if it is determined that the smart phone 300 has been used to present one of the plurality of location-specific digital stories at a different one of the plurality of locations.

Figure 11:
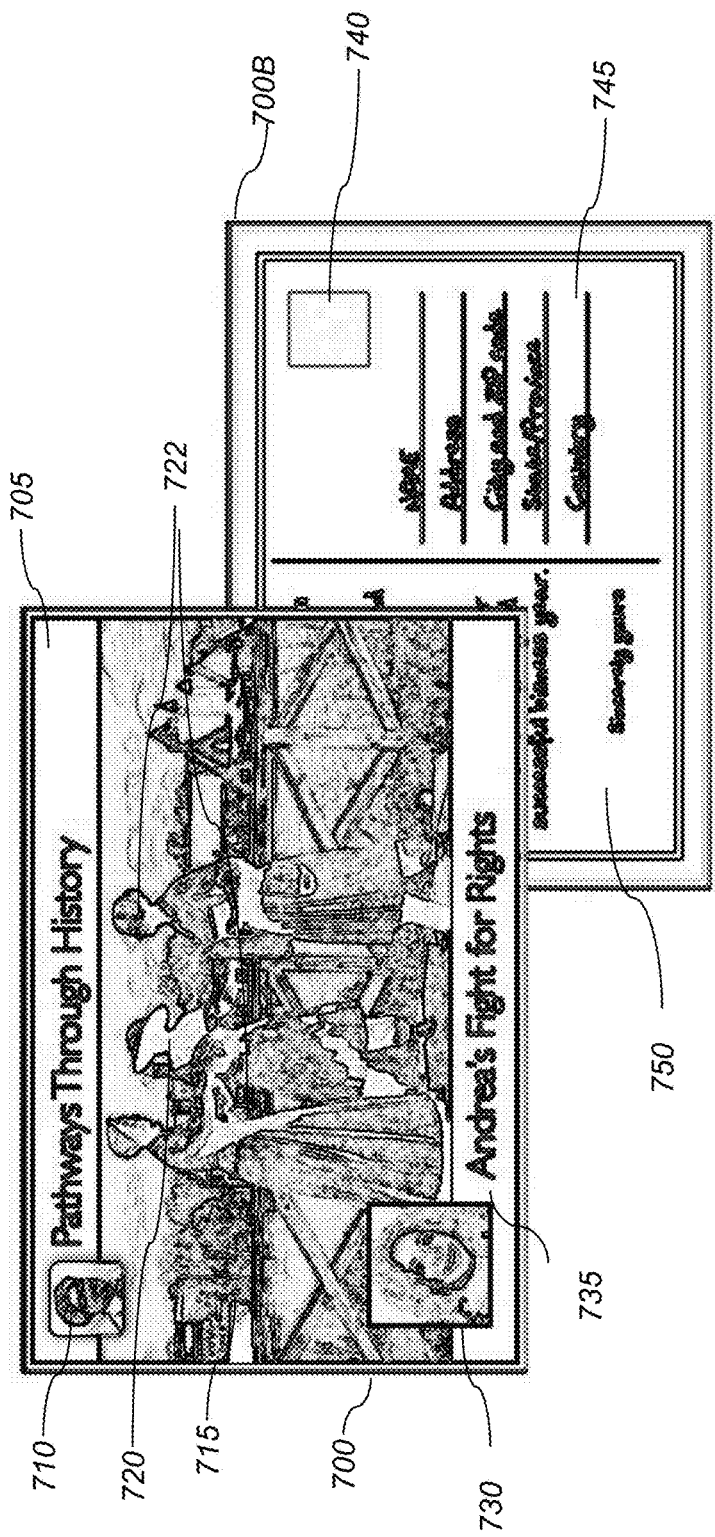
FIG. 11 depicts a photo postcard product which includes a user-captured image and pre-stored information, according to some embodiments of the present invention.

In some embodiments, digital still images or digital video images captured by the user's smart phone 300 during a digital story presentation are included in a photo product which is produced by fulfillment provider 270 in FIG. 2. FIG. 11 depicts a photo postcard product which includes a user-captured image and pre-stored information, according to some embodiments of the present invention. FIG. 11 depicts a photo postcard 700, which is one type of printed photo product which can be provided by fulfillment provider 270. The photo postcard 700 includes a title section 705 which includes a historical character image 710 and the title "Pathways Through History". Title section 705 is provided using pre-stored images and other information stored in content database 290 at the service provider 280 in FIG. 2. The photo postcard 700 also includes a main image 715, which was captured by the user during the digital story presentation, as a result of instructions given to the user during the digital story presentation. The main image 715 depicts a modified user character 720, which includes the user's head but which has been clothed in period clothing using augmented reality techniques. The main image 715 also depicts historical FIG. 722 from the digital story presentation, who have been added to the main image 715 using augmented reality techniques.

The photo postcard 700 also includes an unmodified user photo 730, along with customized text 735 "Andrea's Fight for Rights". Customized text 735 provides the user's name, which has been automatically added by using the name or nickname in the user profile.

The back view 700B of the photo postcard 700 includes a postage section 740. In some embodiments, a postal stamp is affixed to the postage section 740. In other embodiments, a custom stamp providing an image associated with the theme of the digital story experience is printed in the postage section 740, as part of a customized postage stamp. The back view 700B also includes an address section 745, which provides the mailing address of the recipient. In some embodiments, the address section 745 is automatically filled out when the user selects a recipient from the address book stored in their smart phone 300, or from a list of friends addresses stored as part of their user profile.

The back view 700B of the photo postcard 700 also includes a message section 750. In some embodiments, the text message in the message section 750 is automatically derived from pre-stored information and user responses provided by the user during the digital story presentation. In some embodiments, a portion of the text message in the message section 750 is provided by speech to text conversion of the user's spoken comments which have been converted to digital audio signals by mic 342 and audio codec 340 in smart phone 300, and converted to text by digital processor 320 in smart phone 300 or by processor 292 after the digital audio signals have been uploaded to service provider 280.

In some embodiments, one or more user captured images can be modified and composited with pre-stored information. For example, the processor 292 in the computer system 286 can process a user captured image in order to crop out a face of a person depicted in the image, convert the face from a color to a monochrome image, and composite the image of the face into one of a plurality of pre-stored newspaper templates, so that the user captured image appears to be a photograph in a historic newspaper related to the theme of the digital story. In some embodiments, the newspaper text can be modified based on text entered by the user of the smart phone 300. For example, the headline of the newspaper can read "Andrea and Declan fight for rights"

In some embodiments, the service provider 280 provides advertisements or coupons specific to the digital story over the communication network 250 to the smart phone 300. In some embodiments, one or more user captured images can be modified and composited with pre-stored information in order to create the advertisements or coupons.

In some embodiments, a particular advertisement is selected from a plurality of possible advertisements based on various criteria. The criteria can include, for example, demographic information such as the approximate age of the user, as stored in the user profile, or the approximate age of one or more of the persons depicted in the captured digital image. For example, if the captured digital image includes one or more children, the particular advertisement can be for an age-appropriate book or toy related to the theme of the digital story.

The criteria can also include travel route related information, so that the advertisements relate to businesses the user is likely to pass on their trip to the next experience location, or to their vacation destination.

The criteria can also include weather related information such as the current temperature. For example, on warm days the advertisement can provide an offer related to a discount on an ice cream cone at a first nearby merchant along the travel route, and on cold days the advertisement can provide an offer related to a discount on a hot drink at second nearby merchant. In some embodiments, the coupons can be for a limited time period, based on the date and time ambient condition information. In some embodiments, the coupons can customized so that they can only be used by the particular user of the smart phone 300. This can be done, for example, by including one of the digital images captured by the user, as part of the coupon.

In some embodiments, the processor 292 analyzes metadata associated with the user captured digital images, to determine whether the analyzed images were captured within predetermined areas associated with particular location-specific digital stories.

In some embodiments, the processor can analyze the pixel data of the user captured digital images to determine if the images also include a particular object (e.g. a certain building, or a certain type of signpost).

In some embodiments, the processor 282 performs additional analysis on the pixel data of the user captured images, in order to determine the quality of the images. For example, a number of user captured images can be evaluated to select a subset of images which contain the best composition or pose (e.g. the best looking smile), or which provide the best exposed or focused images.

The pre-stored information can include images, graphics, text, or templates. If the photo product to be produced is a digital photo product, such as a video slide show or digital video clip, the pre-stored information can include audio information such as voice narration tracks or music tracks, or video information such as video clips describing the historic site, or video special effects templates or tracks.

In another embodiment of the present invention, the user of mobile phone 300 can be the driver or passenger in a vehicle which is driving along a route. The route can be, for example, a scenic or historic route, such as historic Route 66 in California, the scenic Seaway Trail along Lake Ontario in upstate New York, or Routes 5 and 20 along the Finger Lakes in upstate New York. Vehicles can begin their journeys at various points along the route, and can drive in at least two alternate directions (e.g. west to east, or east to west). Therefore, system 214 is designed to provide digital stories which are appropriate for the user's route, no matter where they begin along the route, or which direction they follow.

FIG. 12 is a flow diagram depicting steps for providing travel direction-dependent digital stories at a plurality of different locations, according to some embodiments of the present invention. In some embodiments, the steps are performed by the service provider 280 in FIG. 2. In other embodiments, some or all of the steps are performed by smart phone 300 in FIG. 3.

In store direction-dependent stories step 850 of FIG. 12, data for a plurality of direction-dependent and location-specific digital stories are stored on a network-accessible storage device system, such as content database 290 in FIG. 2. In some embodiments, the digital stories are stored in association with GPS information, such as geofences, which indicate the locations where the digital stories are to be presented as well as one or more travel directions associated with particular digital stories. For at least some of the locations, two or more different digital stories are stored, each associated with a different travel direction. This is done because some travelers will be driving in a first direction (e.g. an east to west direction) while other travelers will be driving in the opposite direction (e.g. a west to east direction). At least some of the digital stories provide messages that are travel direction-dependent and need to be presented at the appropriate time, and with the appropriate content, for the travel direction. For example, the message "coming up on your right is Naked Dove Brewing Company, the perfect place to learn about beer" is appropriate for east to west travelers, if it presented starting about ¼ mile east of the Naked Dove Brewing Company location. However, for west to east travelers this message is not suitable, and a different message (e.g. "coming up on your left is Naked Dove Brewing Company, the perfect place to learn about beer" needs to be presented starting at a location which is about ¼ mile west of the Naked Dove Brewing Company location.

In some embodiments, direction-dependent, location-specific digital stories are stored for a plurality of different themes or categories in the content database 290. For example, the plurality of themes or categories for users in vehicles driving along Route 5 and 20 could include themes related to the "Fight for Rights" and "Wineries in the Finger Lake region" and categories such as "Best places to eat" and "Fun stops for kids". In some embodiments, the location-dependent digital stories are stored in a memory of smart phone 300, such as image/data memory 330 or firmware memory 328, by downloading an app from the service provider 280. The app can then be selected by the user of smart phone 300, and the instructions provided by the app can be executed by digital processor 320, in order to perform the steps depicted in FIG. 12.

In store user preferences step 855 of FIG. 12, preferences are developed for a plurality of users of mobile devices, such as the users of smart phones 300A, 300B in FIG. 2, and stored in customer database 288. The preferences can indicate an interest in specific topics, such as history or art, or in specific types of visitor attractions, such as antique shops, wineries or microbreweries. In some embodiments, user profiles are also stored, as described earlier in reference to step 405 of FIG. 4. The user preferences indicate whether the user has already been presented with one or more digital stories. If a user has been presented with a digital story, the theme, location, and date/time can be recorded in their user profile. In some embodiments, the user can also indicate a current need, such as the need to locate a relatively nearby restaurant, gas station, or rest room.

In determine user location step 410, the current location of the mobile device for a particular user is determined, as was described earlier in reference to step 410 of FIG. 4. This can be done, for example, by using the GPS receiver 360 in the smart phone 300 (see FIG. 3) to determine the GPS coordinates of the smart phone 300, and by using the digital processor 320 in the smart phone to communicate the GPS coordinates to the service provider 280 using the wireless modem 350.

In at an experience location test 415, a determination is made as to whether the user's current location corresponds to one of the plurality of locations at which location-based digital stories can be provided by system 214 (yes to test 415) or is outside this plurality of experience locations (no to test 415), as described earlier in reference to test 415 in FIG. 4. This can be tested by determining, for example, if the user's smart phone 300 has entered into the geofence for any of the experience locations.

Figure 13:
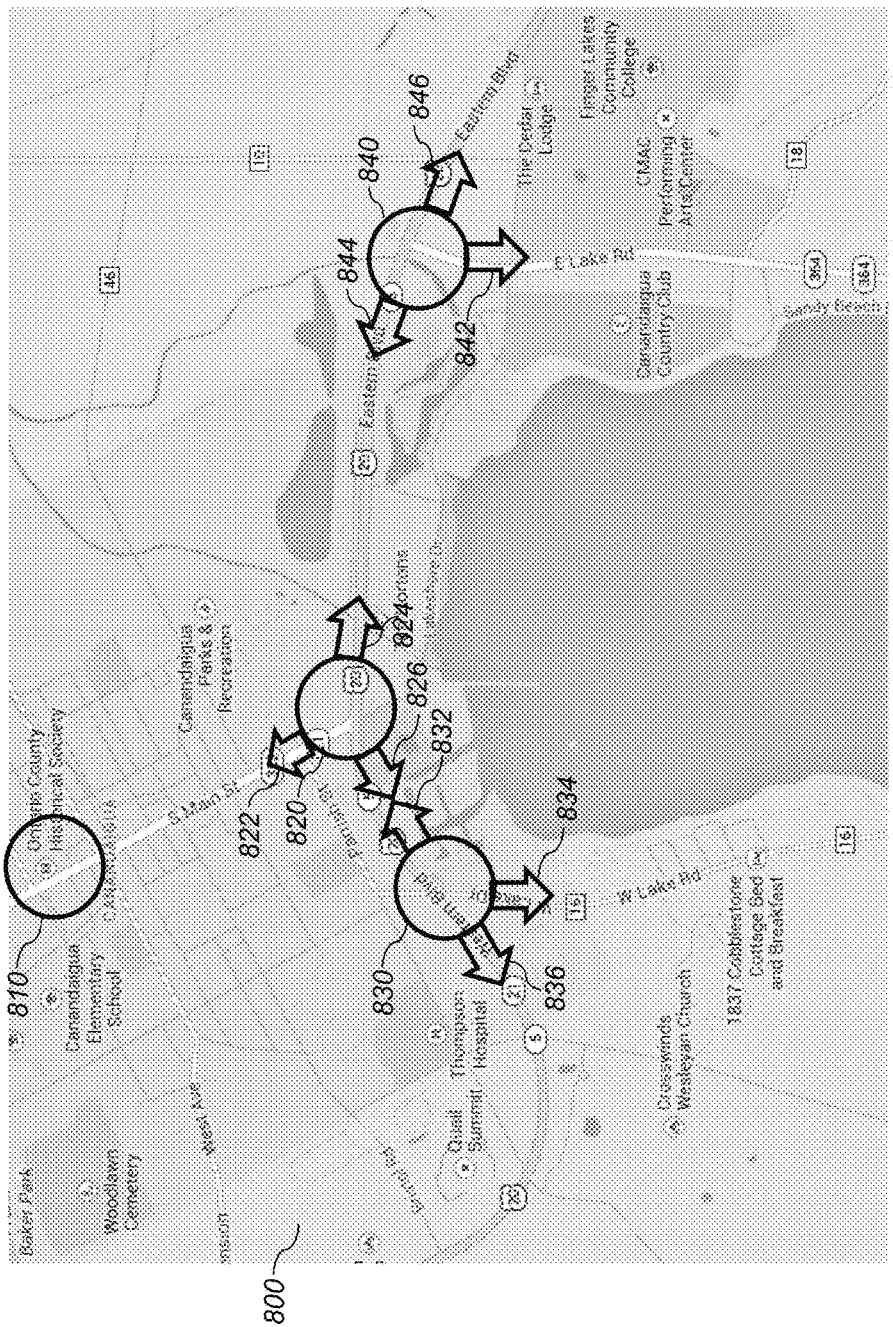
FIG. 13 is an example of a map depicting different locations and travel directions at which travel direction-dependent digital stories can be provided, according to some embodiments of the present invention.

FIG. 13 is an example of a map 800 depicting a plurality of different experience locations and travel directions at which travel direction-dependent digital stories can be provided. In this example, four different geofences, 810, 820, 830, and 840 are positioned at different locations in the Canandaigua, N.Y. area. Geofence 810 is located in the central downtown area, and is associated with a digital story related to the history of Ontario County, which does not depend on the direction of travel. The other three geofences 820, 830, and 840 are associated with direction-dependent digital stories. For example, geofence 840 is associated with different digital stories that correspond to southern travel direction 842, western travel direction 844, and eastern travel direction 846. One particular digital story associated with southern travel direction 842 can relate, for example, to the CMAC performing arts center which the vehicle will soon approach on its left side, or with the Canandaigua Country Club which the vehicle will pass on its right side. One particular digital story associated with western travel direction 844 can relate, for example, to the history of Canandaigua Lake, which the vehicle will soon approach on its left side.

One particular digital story associated with eastern travel direction 846 can relate, for example, to festivals or other events which are taking place in Geneva, N.Y., which is the next major community along Route 5 and 20 to the East. In some embodiments, the digital stories describing these festivals and other events are stored in association with information defining the particular time period (e.g. dates and times) of these events, and is only presented during the particular time period that the events are taking place. In some embodiments, the digital stories describing these events, and the information defining the particular time period of these events, is managed and updated by content curators responsible for the events, using computer 218 in FIG. 3, so that up-to-date information for the events is stored in content database 290.

Geofence 820 is associated with different digital stories that correspond to northern travel direction 822, southwestern travel direction 826, and eastern travel direction 824. One particular digital story associated with northern travel direction 822 can relate, for example, to a business which matches the user's preferences stored in the user profile, as described earlier in relation to step 855. For example, if the user has indicated an interest in antiques, the digital story presented to this user can relate to a particular antique shop located along Main Street in downtown Canandaigua. If the vehicle is following southwestern travel direction 826 and the user has indicated a current need for a gas station, the digital story can relate to one or more nearby gas stations that the user will pass while traveling west along Route 5 and 20. One particular digital story associated with eastern travel direction 824 can relate, for example, to the history of Canandaigua Lake, which the vehicle is passing on the right. In this example, the particular digital story associated with eastern travel direction 824 can be similar to the digital story associated with western travel direction 844, described earlier in relation to geofence 840.

Geofence 830 is associated with different digital stories that correspond to northeastern travel direction 832, southwestern travel direction 836, and southern travel direction 834. The particular digital stories associated with northeastern travel direction 832 can include, for example, two or more different digital stories related to the same venue which is located along the current travel route. For example, the stored direction-dependent digital stories for the New York Wine and Culinary Center can include a first story related to the wine tastings offered at the Center, a second story related to the restaurant located at the Center, and a third story related to the rest room facilities located at the Center. One or more of these three digital stories for the New York Wine and Culinary Center can be presented to users in vehicles headed in the northeastern travel direction 832, depending on the user's preferences and needs, as described earlier in relation to step 855.

One of the digital stories associated with southwestern travel direction 836 can be, for example, a general story describing the history of Route 5 and 20, which started as foot trails established by Native Americans thousands of years ago, and later became part of the transcontinental federal highway between Boston and Newport, Oreg. In some embodiments, this particular digital story can be associated with many different geofences along Route 5 and 20, and can be presented only once, when the user's vehicle first enters one of the geofences associated with this general story. This permits the user to learn about the general history of Route 5 and 20 soon after they begin their journey, but during a time when there are no other attractions or traffic stops to interrupt the story. By updating the user profile after this general story is presented, as described earlier in relation to step 440 of FIG. 4, the general story will not be repeated when the user's vehicle enters the other geofences associated with the same general story during the same trip.

The digital stories associated with travel direction 834 can include, for example, two different digital stories related to the 1837 Cobblestone Cottage Bed and Breakfast. The first digital story can describe the general history of the 1837 Cobblestone Cottage, and the second digital story can describe specific accommodations, such as a room type and room rate. In this example, the second digital story is presented if the user has indicated a user preference for bed and breakfast types of accommodations and if the 1837 Cobblestone Cottage Bed and Breakfast currently has a vacant guest room. If not, the first digital story is presented. In some embodiments, this vacancy information is updated by a content curator responsible for the 1837 Cobblestone Cottage Bed and Breakfast venue, using computer 218, so that up-to-date information is stored in content database 290.

It will be understood that in some embodiments, at some experience locations a digital story could be presented only if the travel direction is determined to be a particular travel direction (e.g. Northern travel direction 822), otherwise a digital story would not be presented. It will also be understood that in some embodiments, at some experience locations a particular digital story could be presented only if it was determined that the travel direction at a specified location prior to entering the experience location was determined to be a particular direction.

From the above description, it will be understood that multiple digital stories can be associated with some travel directions, and can be automatically presented based on user preferences, user needs, and currently available events and accommodations.

Returning to FIG. 12, if the user's current location does not correspond to one of the plurality of story-telling experience locations (no to test 415), the process proceeds to provide general content step 890. In provide general content step 890, various types of content can be provided for the enjoyment of the user. In some embodiments, the content is music (e.g. mp3 files) previously stored by the user on their smart phone 300, or provided by a music streaming service such as Pandora™ Internet Radio. In some embodiments, the music is muted or paused when digital stories are presented in present story step 435, and automatically resumed when the digital story presentation is completed. In some embodiments, the general content can include a digital map showing the vehicle's current location. In some embodiments, standard mapping programs, such as Google Maps, already installed on the smart phone 300 can be used to provide general map content.

If the user's current location corresponds to one of the plurality of experience locations (yes to test 415), the process proceeds to determine travel direction step 860. In some embodiments, the travel direction is determined by comparing recent GPS readings from GPS receiver 360 in smart phone 300, in order to determine, for example, whether the travel direction for a vehicle which has entered geofence 820 in FIG. 13 is northern travel direction 822, southwestern travel direction 826, or eastern travel direction 824. In some embodiments, the travel direction is determined, at least in part, by determining which other geofences the vehicle has recently exited. For example, if the vehicle has recently exited geofence 830, the current travel direction cannot be southwestern travel direction 826.

Figure 14:
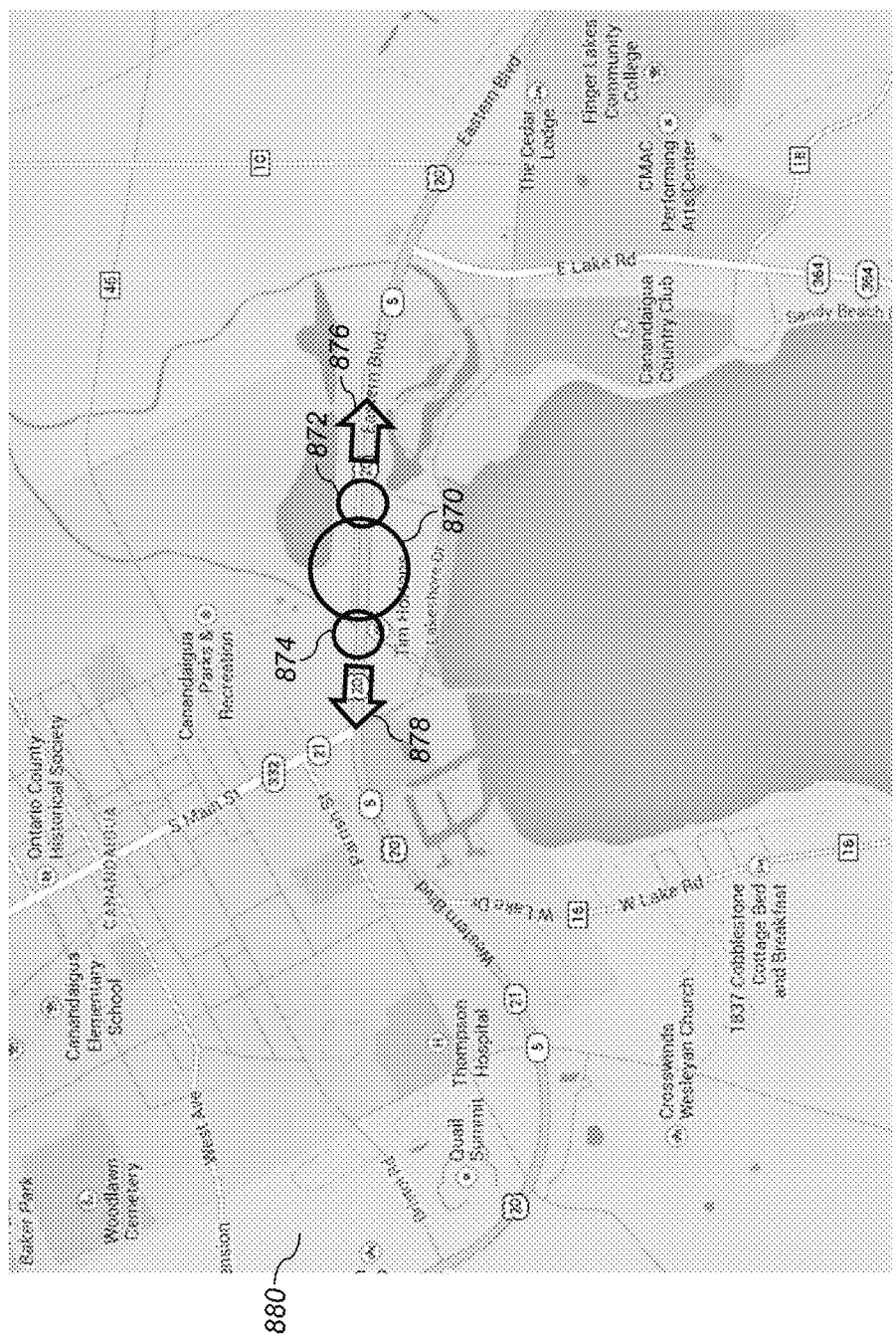
FIG. 14 is an example of a map depicting a plurality of adjacent geofences which can be used to determine a travel direction, according to some embodiments of the present invention.

In some embodiments, multiple adjacent geofences can be used to determine the travel direction for at least some digital story experience locations. FIG. 14 is an example of a map 880 depicting a plurality of adjacent geofences 870, 872, and 874 which can be used to determine a travel direction. For example, if the current location of the mobile device 300 is within the geofence 870 associated with a location-specific digital story, the travel direction can be determined to be an eastern travel direction 876 if the mobile device has recently been located within geofence 874, which is just west of geofence 870. Similarly, the travel direction can be determined to be a western travel direction 878 if the mobile device has very recently been located within geofence 872, which is just east of geofence 870. In some embodiments, if the current location of the mobile device 300 is within the geofence 870 associated with a location-specific digital story and the mobile device has not recently been located within geofence 874, the travel direction can be determined to be a western travel direction 878, since the only possible travel directions are eastern travel direction 876 and western travel direction 878.

Returning to FIG. 12, in select direction-dependent story step 865, one of a plurality of possible digital stories is selected based on the travel direction. As described earlier in relation to FIG. 13, in addition to the travel direction, in some embodiments the digital story can be selected responsive to stored user preferences and current user needs. In some embodiments, the selection is performed using the processor 292 at the service provider 280, and the selected digital story is transferred to the smart phone 300 over the communication network 250. In some embodiments, the selection is performed using the digital processor 320 in smart phone 300, which selects one of the location-dependent digital stories previously stored in image/data memory 330 or firmware memory 328. In some embodiments, the location-dependent digital stories are stored in image/data memory 330 when an app is downloaded from the service provider 280 to the firmware memory 328, as described earlier in reference to store direction-dependent stories step 850.

In present story step 435, the direction-dependent digital story selected in step 865 is presented to the user. As described earlier in relation to step 435 in FIG. 4, the digital story can be presented to the user using a variety of story-telling methods, such as audio stories, text-based stories, video stories, and augmented-reality stories. In some embodiments, the user selects a preferred story-telling method from a menu offering a variety of choices, in store user preferences step 855. For example, if the driver of the vehicle is interested in the digital story, the digital story can be presented using audio narration, sound effects, and music. If only a single passenger is interested in the digital story, the digital story can be presented using text and images, which can be read and viewed by the passenger without disturbing the driver of the vehicle. If the smart phone 300 has been presenting general content, such as music, as described earlier in relation to provide general content step 890, the general content is stopped, muted or paused while the story is presented in present story step 435, and then automatically resumed after the story is presented.

In update user profile step 440, the user profile is updated based on the digital story presented to the user, as described earlier in relation to update user profile step 440 of FIG. 4.

For example, the user profile can be updated to indicate that the user has been presented with a specific direction-dependent digital story. In some embodiments, if the digital story related to a specific venue, such as an antique shop or a winery, the system 214 determines if the user stopped at the venue, and if the user did stop, the system 214 determines the approximate period of time that the user spent at the venue. In some embodiments, the GPS receiver 360 in the mobile phone 300 is used in determining if the user stopped at the venue, and the approximate time period of the stop. This can be done, for example, by determining the time period during which the GPS location of the mobile phone 300 was approximately equal to the GPS location of the venue.

In the foregoing detailed description, the methods and apparatuses of the present invention have been described with reference to specific exemplary embodiments thereof. It will, however, be evident that various modifications and changes can be made thereto without departing from the broader scope of the present invention. The present specification and figures are accordingly to be regarded as illustrative rather than restrictive.

A computer program product can include one or more non-transitory storage mediums, for example; magnetic storage media such as magnetic disk (such as a floppy disk) or magnetic tape; optical storage media such as optical disk, optical tape, or machine readable bar code; solid-state electronic storage devices such as random access memory (RAM), flash EPROM memory, or read-only memory (ROM); or any other physical device or media employed to store a computer program having instructions for controlling one or more computers to practice any of the methods according to any embodiment of the present invention.

PARTS LIST

100 System
110 Processor-Accessible Memory Device System
120 Data Processing Device System
130 Data Input-Output Device System
214 System
218 Computer
220 Communication Services Provider (CSP)
222 Communication Services Provider (CSP)
224 Kiosk Printer
240 Cellular Provider Network
250 Communication Network
268 Transportation Vehicle
270 Fulfillment Provider
272 Web Server
274 Commerce Manager
275 Fulfillment Manager
276 Fulfillment Manager
278 Digital Printer
279 DVD Writer
280 Service Provider
282 Web Server at Service Provider
284 Account Manager
286 Computer System
288 Customer Database
290 Content database
292 Processor
300A Smart phone at location A
300B Smart phone at location B
300 Smart phone
302 Flash
304 Lens
310 CMOS Image Sensor
312 Timing Generator
314 Image Sensor Array
316 A/D Converter
318 DRAM Buffer Memory
320 Digital Processor
322 RAM
324 Real Time Clock
328 Firmware Memory
330 Image/Data Memory
332 Color Display
334 User Controls
340 Audio Codec
342 Microphone
344 Speaker
350 Wireless Modem
352 RF Channel
360 GPS Receiver
362 Dock Interface
364 Dock Recharger
400 Store Location Specific Stories Step
405 Store User Profiles Step
410 Determine User Location Step
415 At An Experience Location Test
420 Provide Directions Step
425 Select Location-Specific Story Step
435 Present Story Step
440 Update User Profile Step
450 Suggest Next Location Step
500 Access User Profile Step
505 Viewed Earlier Story Test
510 Provide First Digital Story Step
515 Introduce Theme & Character Step
520 Provide Second Digital Story Step
525 Continue Theme & Character Step
530 Map
531 Experience Location "1"
532 Experience Location "2"
533 Experience Location "3"
612 Story Greeting Window
614 User Photo
616 Message Window
620 Story Selection Window
622 Wine Story Image
624 Wine Story
632 Amelia Story Image
634 Amelia Story
640 Story Introduction Window
642 Map
646 Follow Amelia Icon
648 Another Theme Icon
660 First Location-Specific Digital Story
662 Scene
664 Statue of Amelia
670 Second Location-Specific Digital Story
680 Third Location-Specific Digital Story
682 House
690 Fourth Location-Specific Digital Story
692 Sign
700 Photo Postcard
700B Back View of Photo Postcard
705 Title Section
710 Historical Character Image
715 Main Image
720 Modified User Character
722 Historical FIGS.
730 Unmodified User Image 735 Customized Title
740 Postage Section
745 Address section
750 Message section
800 Map
810 Geofence
820 Geofence
822 Northern Direction
824 Eastern Direction
826 Southwestern Direction
830 Geofence
832 Northeastern Direction
834 Southern Direction
836 Western Direction
840 Geofence
842 Southern Direction
844 Western Direction
846 Eastern Direction
850 Store Direction-Dependent Stories Step
855 Store User Preferences Step
860 Determine Travel Direction Step
865 Select Direction-Dependent Story Step
870 Geofence
872 Geofence
874 Geofence
876 Eastern direction
878 Western direction
880 Map
890 Provide General Content Step

What is claimed is:

1. A mobile device comprising:
a) a memory device system storing story content data;
b) an output device system;
c) a location determination unit configured to determine a geographic location of the mobile device; and
d) a data processing device system communicatively connected to the output device system, the memory device system, and the location determination unit, wherein the memory device system stores program instructions configured to cause the data processing system at least to:
store, in the memory device system, data for a first plurality of digital stories associated with a second plurality of different locations, including data for a first digital story associated with a third plurality of different locations, the data for the first digital story including audio story data and text-based story data;
determine when a current location of a mobile device first corresponds to one of the third plurality of different locations;
determine whether the average speed of the mobile device is above a threshold speed; and
when it is determined that the current location of the mobile device first corresponds to one of the third plurality of different locations and it is determined that the average speed of the mobile device is above the threshold speed, acquire, from the memory device system, the audio story data for the first digital story and provide the audio story data for the first digital story to the output device system; and
when it is determined that the current location of the mobile device first corresponds to one of the third plurality of different locations and it is determined that the average speed of the mobile device is below the threshold speed, acquire, from the memory device system, the text-based story data for the first digital story and provide the text-based story data for the first digital story to the output device system.

2. The mobile device of claim 1, wherein the output device system includes a wireless modem which transmits a digital audio signal over an RF channel.

3. The mobile device of claim 1, wherein the memory device system stores a user profile for the user of the mobile device, and wherein the data processing system is further configured at least to:
update the user profile when it is first determined that the current location of the mobile device associated with the user corresponds to one of the third plurality of different locations; and
use the user profile to determine whether to provide the first digital story to the mobile device when it is determined that the current location of the mobile device corresponds to one of the third plurality of different locations.

4. The mobile device of claim 1, wherein the threshold speed is approximately 10 miles per hour.

5. A system comprising:
a storage device system storing data for a digital story associated with a particular location, the data for the digital story including audio story data and text-based story data;
a location determination unit configured to determine a geographic location of a mobile device; and
a data processing device system configured at least to:
determine when a current location of the mobile device corresponds to the particular location;
determine whether the average speed of the mobile device is above a threshold speed; and
when it is determined that the current location of the mobile device corresponds to the particular location and it is determined that the average speed of the mobile device is above the threshold speed, provide the audio story data; and
when it is determined that the current location of the mobile device corresponds to the particular location and it is determined that the average speed of the mobile device is below the threshold speed, provide the text-based story data.

6. The system of claim 5, wherein the particular location is defined using a geofence.

7. The system of claim 6, wherein the storage device system stores data which identifies the geographic location of the geofence.

8. The system of claim 5, wherein the storage device system stores data for a first plurality of digital stories associated with a second plurality of different locations.

9. The system of claim 5, wherein the storage device system, the location determination unit, and the data processing device system are included in the mobile device.

10. The system of claim 5, wherein the storage device system is a network-accessible storage device system.

11. The system of claim 5, wherein the audio story data is provided to a speaker in the mobile device and the text story data is provided to an image display in the mobile device.

12. The system of claim 5, wherein the audio story data is provided to a wireless modem which transmits a digital audio signal over an RF channel.

13. The system of claim 5, wherein the data for the digital story data includes image data.

14. A method executed by a data processing device system, the method comprising the steps of:

storing, in a storage device system, data for a digital story associated with a particular geographic location, the data for the digital story including audio story data and text-based story data;

determining when a current location of a mobile device corresponds to the particular geographic location;

determining whether the average speed of the mobile device is above a threshold speed; and when it is determined that the current location of the mobile device corresponds to the particular geographic location and it is determined that the average speed of the mobile device is above the threshold speed, providing the audio story data; and when it is determined that the current location of the mobile device corresponds to the particular geographic location and it is determined that the average speed of the mobile device is below the threshold speed, providing the text-based story data.

15. The method of claim 14, wherein the digital story relates to the history of the particular geographic location.

16. The method of claim 14, wherein the digital story is presented using a particular character selected by a user of the mobile device.

17. The method of claim 16, further including the step of storing, in a storage device system, a user profile which identifies the particular character selected by a user of the mobile device.

18. The method of claim 14, wherein the storage device system is a network-accessible storage device system.

19. The method of claim 14, wherein the storage device system stores data for a first plurality of digital stories associated with a second plurality of different geographic locations.

20. The method of claim 14, wherein the audio story data is provided to a speaker in the mobile device and the text story data is provided to an image display in the mobile device.

* * * * *